(12) United States Patent
Nandy

(10) Patent No.: US 11,348,114 B2
(45) Date of Patent: May 31, 2022

(54) ONLINE FRAUD PREVENTION USING GENETIC ALGORITHM SOLUTION

(71) Applicant: PayPal, Inc., San Jose, CA (US)

(72) Inventor: Palash Nandy, San Francisco, CA (US)

(73) Assignee: PayPal, Inc., San Jose, CA (US)

(*) Notice: Subject to any disclaimer, the term of this patent is extended or adjusted under 35 U.S.C. 154(b) by 0 days.

(21) Appl. No.: 17/020,594

(22) Filed: Sep. 14, 2020

(65) Prior Publication Data
US 2021/0012349 A1 Jan. 14, 2021

Related U.S. Application Data

(63) Continuation of application No. 16/188,174, filed on Nov. 12, 2018, now Pat. No. 10,776,790, which is a
(Continued)

(51) Int. Cl.
G06Q 20/40 (2012.01)
G06Q 20/10 (2012.01)
(Continued)

(52) U.S. Cl.
CPC .......... *G06Q 20/4016* (2013.01); *G06N 5/02* (2013.01); *G06N 5/025* (2013.01); *G06N 5/027* (2013.01);
(Continued)

(58) Field of Classification Search
CPC .. G06Q 20/4016; G06Q 20/10; G06Q 20/405; G06N 5/025; G06N 3/126
(Continued)

(56) References Cited

U.S. PATENT DOCUMENTS 5,790,645 A 8/1998 Fawcett et al.
5,819,226 A 10/1998 Gopinathan et al.
(Continued)

FOREIGN PATENT DOCUMENTS

WO 98/32086 7/1998

OTHER PUBLICATIONS

S Abu-Hakima, M. Toloo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.
(Continued)

*Primary Examiner* — Robert R Niquette
(74) *Attorney, Agent, or Firm* — Kowert, Hood, Munyon, Rankin & Goetzel, P.C.

(57) ABSTRACT

Online fraud prevention including receiving a rules set to detect fraud, mapping the rules set to a data set, mapping success data to members of the rules set, filtering the members of the rules set, and ordering members of the data set by giving priority to those members of the data set with a greater probability for being fraudulent based upon the success data of each member of the rule set in detecting fraud. Further, a receiver coupled to an application server to receive a rules set to detect fraud, and a server coupled to the application server, to map the rules set to a data set, and to map the success data to each members of the rules set. The server is used to order the various members of the data set by giving priority to those members of the data set with a greatest probability for being fraudulent.

19 Claims, 15 Drawing Sheets

Related U.S. Application Data continuation of application No. 14/558,582, filed on Dec. 2, 2014, now abandoned, which is a continuation of application No. 13/682,055, filed on Nov. 20, 2012, now Pat. No. 8,930,268, which is a continuation of application No. 12/939,936, filed on Nov. 4, 2010, now Pat. No. 8,321,341, which is a continuation of application No. 12/638,942, filed on Dec. 15, 2009, now Pat. No. 7,840,520, which is a continuation of application No. 11/593,962, filed on Nov. 7, 2006, now Pat. No. 7,657,497.

(51) Int. Cl.
*G06N 3/12* (2006.01)
*G06N 5/02* (2006.01)
*G06Q 30/00* (2012.01)

(52) U.S. Cl.
CPC ........... *G06Q 20/10* (2013.01); *G06Q 20/405* (2013.01); *G06Q 30/018* (2013.01); *G06N 3/126* (2013.01)

(58) Field of Classification Search
USPC .......................................................... 705/44
See application file for complete search history.

(56) References Cited

U.S. PATENT DOCUMENTS

| | | | |
|---|---|---|---|
| 5,822,741 A | 10/1998 | Fischthal | |
| 6,029,144 A | 2/2000 | Barrett | |
| 6,094,643 A | 7/2000 | Anderson et al. | |
| 6,157,707 A | 12/2000 | Baulier et al. | |
| 6,449,611 B1 | 9/2002 | Frankel et al. | |
| 6,601,048 B1 | 7/2003 | Gavan et al. | |
| 6,850,606 B2 | 2/2005 | Lawyer et al. | |
| 6,886,008 B2 | 4/2005 | Blayvas et al. | |
| 6,941,285 B2 | 9/2005 | Sarcanin | |
| 6,941,287 B1 | 9/2005 | Vaidyanathan et al. | |
| 7,014,108 B2 | 3/2006 | Sorenson et al. | |
| 7,089,592 B2 | 8/2006 | Adjaoute | |
| 7,092,398 B2 | 8/2006 | Schweitzer | |
| 7,093,130 B1 | 8/2006 | Kobayashi et al. | |
| 7,136,841 B2 | 11/2006 | Cook | |
| 7,263,506 B2 | 8/2007 | Lee et al. | |
| 7,331,521 B2 | 2/2008 | Sorenson et al. | |
| 7,376,431 B2 | 5/2008 | Niedermeyer | |
| 7,403,922 B1 | 7/2008 | Lewis et al. | |
| 7,433,855 B2 | 10/2008 | Gavan et al. | |
| 7,436,989 B2 | 10/2008 | Chung et al. | |
| 7,457,401 B2 | 11/2008 | Lawyer et al. | |
| 7,587,367 B2 | 9/2009 | Mengerink | |
| 7,627,543 B2* | 12/2009 | Lock .................... | G06N 5/025 706/47 |
| 7,657,497 B2 | 2/2010 | Nandy | |
| 7,721,336 B1* | 5/2010 | Adjaoute ............ | H04L 63/1408 726/25 |
| 7,840,520 B2 | 11/2010 | Nandy | |
| 7,885,915 B2* | 2/2011 | Parson ................. | G06F 40/211 706/47 |
| 8,019,678 B2 | 9/2011 | Wright et al. | |
| 8,321,341 B2 | 11/2012 | Nandy | |
| 8,930,268 B2 | 1/2015 | Nandy | |
| 2002/0161711 A1 | 10/2002 | Sartor et al. | |
| 2003/0097320 A1 | 5/2003 | Gordon | |
| 2005/0182712 A1 | 8/2005 | Angell | |
| 2006/0010093 A1 | 1/2006 | Fan et al. | |
| 2006/0202012 A1 | 9/2006 | Grano et al. | |
| 2007/0106580 A1* | 5/2007 | Yang .................... | G06Q 20/042 705/35 |
| 2007/0119919 A1 | 5/2007 | Hogg et al. | |
| 2008/0091545 A1 | 4/2008 | Jennings et al. | |
| 2008/0109392 A1 | 5/2008 | Nandy | |
| 2009/0192957 A1 | 7/2009 | Subramanian et al. | |
| 2009/0265211 A1 | 10/2009 | May et al. | |
| 2010/0094765 A1 | 4/2010 | Nandy | |
| 2011/0055078 A1* | 3/2011 | Nandy ............... | G06Q 20/4016 705/39 |
| 2013/0080368 A1 | 3/2013 | Nandy | |
| 2017/0193514 A1* | 7/2017 | Chen .................. | G06Q 20/4016 |
| 2018/0150523 A1* | 5/2018 | Shiftman ............... | G06N 5/025 |
| 2018/0225668 A1* | 8/2018 | May ........................ | G06Q 20/02 |
| 2020/0372509 A1* | 11/2020 | Phalnikar ........... | G06Q 20/4016 |

OTHER PUBLICATIONS

U.S. Appl. No. 11/593,962 Non-Final Office Action dated Mar. 27, 2009, OARN, 16 pgs.

U.S. Appl. No. 11/593,962, Notice of Allowance dated Sep. 15, 2009, 10 pgs.

U.S. Appl. No. 11/593,962, Response filed Jul. 24, 2009 to Non Final Office Action dated Mar. 27, 2009, 15 pgs.

U.S. Appl. No. 12/638,942, Non-Final Office Action dated Apr. 9, 2010, 2 pgs.

U.S. Appl. No. 12/638,942, Response filed Jul. 8, 2010 to Non Final Office Action dated Apr. 9, 2010, 3 pgs.

U.S. Appl. No. 12/638,942, Notice of Allowance dated Jul. 20, 2010, 9 pgs.

U.S. Appl. No. 12/939,936, Non Final Office Action dated Jan. 26, 2012, 13 pgs.

U.S. Appl. No. 12/939,936, Notice of Allowance dated Jul. 24, 2012, 7 pgs.

U.S. Appl. No. 12/939,936, Response filed Apr. 26, 2012 to Non Final Office Action dated Jan. 26, 2012, 16 pgs.

Debar, et al., "A Neural Network Component for an Intrusion Detection System", Proceedings of the Computer Society Symposium on Research in Security and Privacy, vol. SYMP.13, (May 4, 1992), 240-250.

Devroye, L., "Any Discrimination Rule Can Have an Arbitrarily Bad Probability of Error for Finite Sample Size", IEEE Transactions on Pattern Analysis and Machine Intelligence, vol. PAMI-4, Issue; 2, (1982), 154-157.

Kohler, M., et al., "On the Rate of Convergence of Local Averaging Plug-In Classification Rules Under a Margin Condition Under a Margin Condition, Kohler, M.; Kryzak, A.;", IEEE Transactions on Information Theory, 53(5), (2007), 1735-1742.

Leung, A., et al., "On designing a flexible e-payment system with fraud detection capability", IEEE International Conference on e-Commerce Technology, 2004. CEC 2004. Proceedings., (2004), 236-243.

Martella, G., et al., "An Availability Model for Distributed Transaction Systems", IEEE Transactions on Software Engineering, vol. SE-11, Issue: 5, (1985), 483-491.

Metwally, Ahmed, et al., "On Hit Inflation Techniques and Detection in Streams of Web Advertising Networks", Distributed Computing Systems, 2007. ICDCS '07. 27th International Conference, (2007), 52-52.

Montgomery, B. L, et al., "On decoding rules to minimize the probability of information bit errors", IEEE Transactions an Information Theory, 34(4), (1988), 880-881.

Rozsnyai, S, et al., "Solution architecture for detecting and preventing fraud in real time", 2nd International Conference an Digital Information Management, 2007 ICDIM '07, vol. 1, (2007), 152-158.

Venkataram, P., et al., "A Method of Fraud & Intrusion Detection for E-payment Systems in Mobile e-Commerce ", IEEE International Performance, Computing, and Communications Conference, 2007. IPCCC 2007., (2007), 395-401.

Kohler, M., et al., "On the Rate of Convergence of Local Averaging Plug-In Classification Rules Under a Margin Condition Under a Margin Condition, Kohler, M.; Krzyzak, A.;", IEEE on Information Theory, 53(5), (2007), 1735-1742.

Modena, G., et al., "An Availability Model for Distributed Transaction Systems", IEEE Transactions on Software Engineering, vol. SE-11, Issue: 5, (1985), 483-491.

(56) References Cited

OTHER PUBLICATIONS

Rozsnyai, S, et al., "Solution architecture for detecting and preventing fraud in real time", International Conference on Digital Information Management, 2007. ICDIM '07, vol. 1, (2007), 152-158.
Entire Prosecution History of U.S. Appl. No. 11/593,962, titled Online Fraud Prevention Using Genetic Algorithm Solution, filed Nov. 7, 2006.
Entire Prosecution History of U.S. Appl. No. 12/638,942, titled Online Fraud Prevention Using Genetic Algorithm Solution, filed Dec. 15, 2009.
Entire Prosecution History of U.S. Appl. No. 12/939,936, titled Online Fraud Prevention Using Genetic Algorithm Solution, filed Nov. 4, 2010.
Entire Prosecution History of U.S. Appl. No. 13/682,055, titled Online Fraud Prevention Using Genetic Algorithm Solution, filed Nov. 20, 2012.
Entire Prosecution History of U.S. Appl. No. 14/558,582, titled Online Fraud Prevention Using Genetic Algorithm Solution, filed Dec. 2, 2014.

\* cited by examiner

200

201
NAME: [____] 202  DESCRIPTION (WILL BE ADDED TO ACTIVITY LOG) 203
OWNER: [____]
OUTPUT: ◉ TRACKING    (CHOOSE TRACKING IF YOU ARE UNSURE ABOUT THE RULE)
205      ○ FRAUD QUEUE  [DEFAULT (MANUAL DARWIN)]
                                                                    204

☐ EMAIL ADDRESS
EMAIL  206  MATCH AGAINST EMAIL ADDRESS OF SENDER OR RECIPIENT
[____]

☐ CREDIT CARD NUMBER
CC NUM
[____] 207  ENTER FULL ENCRYPTED CREDIT CARD NUMBER. WILL FLAG ACCOUNTS ASSOCIATED WITH THE TRANSACTION FUNDED BY MATCHING CARD.

☐ ACCOUNT TYPE
TYPE ID
[____]  ENTER THE ID OF THE TYPE OF ACCOUNT TO MATCH. USE THIS IN COMBINATION WITH OTHER DATA TO BE EFFECTIVE.
208

☐ NEURAL NETWORK SCORE
SCORE
[____]  ENTER THE SCORE TO BE MATCHED FROM NN TRANS EVALUATION. SCORE MUST BE WITHIN 0 AND 1.
209

☐ SPOOF FLAG
212    ACCOUNT HAS BEEN FLAGGED AS POTENTIALLY SPOOFED.

☐ FRAUD MODEL HIT
MODEL ID  213  ENTER THE MODEL ID TO BE MATCHED AGAINST. ACCOUNTS SCORED HIGH ON THIS MODEL WILL BE ENTERED.
[____]

FIG. 2

| 701 | 702 | | 704 2% | | | | | | | | | | 705 | |
|---|---|---|---|---|---|---|---|---|---|---|---|---|---|---|
| 231 | CHURCH RING 703 jsmith@email.com | | 2% | — 5 | — | — 14 | — 12 | — 9 | — | — 6 | — 6 | — 8 | — 13 | — 5 | — 5 | — 6 | — 5 |
| 230 | DIJKSTRA RING jsmith@email.com | | 0% | | | | | | | | | | | | | |
| 227 | TURING RING jsmith@email.com | | 15% | — 8 | — 16 | — 11 | — 7 | — 9 | — 10 | — 6 | — 12 | — 11 | — 8 | — 10 | — 10 | — 8 706 |
| 226 | FIBONACCI RING jsmith@email.com | | 4% | — 119 | — 142 | — 119 | — 135 | — 119 | — 83 | — 112 | — 106 | — 108 | — 120 | — 127 | — 94 | — 69 |

ONLINE FRAUD PREVENTION USING GENETIC ALGORITHM SOLUTION

CROSS-REFERENCE TO RELATED APPLICATIONS

This application is a continuation of U.S. patent application Ser. No. 16/188,174, filed on Nov. 12, 2018, which is a continuation of U.S. patent application Ser. No. 14/558,582, filed on Dec. 2, 2014, which is a continuation of U.S. patent application Ser. No. 13/682,055, filed on Nov. 20, 2012, now U.S. Pat. No. 8,930,268, issued on Jan. 6, 2015; which is a continuation of U.S. patent application Ser. No. 12/939,936, filed on Nov. 4, 2010, now U.S. Pat. No. 8,321,341, issued on Nov. 27, 2012; which is a continuation of U.S. patent application Ser. No. 12/638,942, filed on Dec. 15, 2009, now U.S. Pat. No. 7,840,520, issued on Nov. 23, 2010; which is a continuation of U.S. patent application Ser. No. 11/593,962, filed on Nov. 7, 2006, now U.S. Pat. No. 7,657,497, issued on Feb. 2, 2010; the disclosures of application Ser. Nos. 14/558,582, 13/682,055, 12/939,936, 12/638,942, and 11/593,962 and the corresponding patents are incorporated by reference herein.

TECHNICAL FIELD

The present application relates generally to the technical field of algorithms and programming and, in one specific example, to the use of genetic algorithms and programming to optimize fraud prevention rules as embodied in software as implemented in a computer.

BACKGROUND

The problem of online fraud is one that has challenged businesses engaging in electronic commerce ("E-commerce") since the Internet was initially used as a means to buy and sell good and services. One aspect of the problem is that as the persons committing the fraud (fraudsters) tend to become more sophisticated with every new technological innovation designed to stop or deter them. More to the point, with every new anti-fraud innovation, the fraudsters respond with an even more sophisticated form of fraud. In short, a race exists whereby the fraudsters create a new type of fraudulent scheme, and the E-commerce business must develop a way to detect this fraud.

Many times the level of fraud committed by a fraudster is a function of the time that they have to commit the fraud. That is, the more time the fraudster has to commit the fraud, the greater fraud. This time aspect is, in turn, contingent upon the ability of the E-commerce business to discover the fraud such that the longer it takes the E-commerce business to discover the fraud, the longer the fraudster has to commit the fraud and, hence the greater the fraud.

Fraudulent schemes involving E-commerce can be as elementary as using stolen credit card numbers to purchase goods and services on line, to more sophisticated schemes whereby false email addresses, buyer or seller information is used to transact business. One of the most common types of fraud involves Internet auction sites. According to the Federal Trade Commission and Internet Fraud Watch, fraudulent schemes appearing on online auction sites are the most frequently reported form of Internet fraud. These schemes, and similar schemes for online retail goods, typically purport to offer high-value items—ranging from Cartier™ watches to computers to collectibles such as Beanie Babies™—that are likely to attract many consumers. These schemes induce their victims to send money for the promised items, but then deliver nothing or only an item far less valuable than what was promised (e.g., counterfeit or altered goods). While government policing agencies have stepped up efforts to thwart this fraud, fraudulent schemes still exist.

In response to these various fraudulent schemes, E-commerce sites have developed a number of types of tools to deal with these schemes. One type of tool developed by E-commerce sites is the use of various statistical models that use logistical regression, or some other type of statistical regression model, to look for and determine the long terms buying and selling trends of users, and using these trends, analyzing groups of online sales for fraud. For example, if transactions originating from a particular geographic location for a particular type of good or service are determined to commonly involve fraud (e.g., Cartier™ watches being sold by sellers located in Antarctica), then statistical modeling will typically be able to capture such an instance of fraud. Another tool used by various E-commerce sites is rule based modeling. In rules based modeling, specific rules are generated to combat and address specific fraudulent schemes. For example, if a particular seller from a particular geographical region (e.g., John Smith from California) is known to be a fraudster, then a rule can be set up to prevent this person from transacting business on a particular E-commerce site.

Both statistical models and rules based modeling have limitations in their abilities to detect fraud. For example, statistical models are very slow to detect fraud and suffer greatly from being unable to meet the ever increasing sophistication of fraudsters. Moreover, such models fail to segment well. That is, they rarely are able to provide specific information regarding specific instances of fraud; rather they typically provide a broad overview regarding losses from fraud generally. Using the above example, while statistical models may be able to tell you the amount of loss due to fraud in monetary terms, they typically would not be able to tell you the exact time, and date of a particular loss, not unless a further statistical model was generated to analyze time and date data.

A limitation for rule based modeling comes in the form of the reductionism that is inherent in rules based modeling. That is, the rules in rules based modeling are either applied or not applied to set of facts, and nuances within this set of facts is typically ignored. Again, using the above example, if a rule is created to flag every transaction by a person named "John Smith" who resides in California, then while the Fraudster named John Smith who resides in California might be stopped, so would all legitimate transactions by persons named John Smith who live in California. Other problems arising from rules based modeling come in the form of the fact that each rule must typically be manually entered into a system (e.g., someone must actually write and implement a rule that prohibits "John Smith from California" from engaging in transactions). This manual entering of rules has various computational costs associated with it. More to the point, many times, during the course of applying these manually entered rules, each rule must be applied to each set of facts such that as the number of rules grow, so does the computing times necessary to apply these rules. In some cases, this can result in instances where the computational complexity associated with applying these rules is on the order of $O(n)$.

Not only can the computational costs associated with rules based modeling be costly, but the actual financial costs can also be costly. Many E-commerce sites have an elaborate, labor intensive, security apparatus for protecting against fraud. For example, when a fraudulent scheme is discovered, transactions associated with this scheme are, in many cases, flagged by the particular E-commerce site (e.g., eBay™) on which the transaction is taking place. Flagging a transaction means that the transaction will be examined more closely and, in some cases, stopped by the E-commerce site. In some instances, not only is the transaction flagged, but the account used in facilitating the fraud is also flagged. Many E-commerce sites have an entire fraud escalation apparatus, whereby potential fraud is identified and then the facts regarding the potential fraud are escalated to additional persons for further review and a determination regarding the existence of fraud. This process of identifying fraud and escalating fraud may involve two of more tiers of review, with a first tier of review by, for example, Floor Agents (or Regular Agents) reviewing data posted on the E-commerce by sellers of goods or services. Then, there is a second tier of review by Risk Agents (or Senior Agents and Risk Analysts) who review the flagged transactions and determine where the transaction is fraudulent. In those cases where the transaction is deemed fraudulent, yet no rule exists for this particular type of fraudulent scheme, then a new rule is generated by those at the second tier of review. In some cases, there is even a third tier of review by those Management and Tracking Agents charged with reviewing the activities of the Risk Agents.

In some cases, the phenomena of information loss occurs between the various tiers of review. For example, in some cases certain factors that go into the detection of fraud by those at the Regular Agent level cannot be easily or accurately conveyed to those at the higher tiers such as the Risk Agents and their managers. These factors can, among other things, include intuition.

BRIEF DESCRIPTION OF THE DRAWINGS

Some embodiments are illustrated by way of example and not limitation in the figures of the accompanying drawings in which:

FIG. 2 is a user interface diagram illustrating a Graphical User Interface (GUI), according to example embodiments used to generate rules.

FIG. 7 is a screen shot illustrating a user interface to present information regarding success of a series of rules.

DETAILED DESCRIPTION

Example methods and systems to enhance fraud detection are described. In the following description, for purposes of explanation, numerous specific details are set forth in order to provide a thorough understanding of example embodiments. It will be evident, however, to one skilled in the art that the present invention may be practiced without these specific details.

Figure 1:
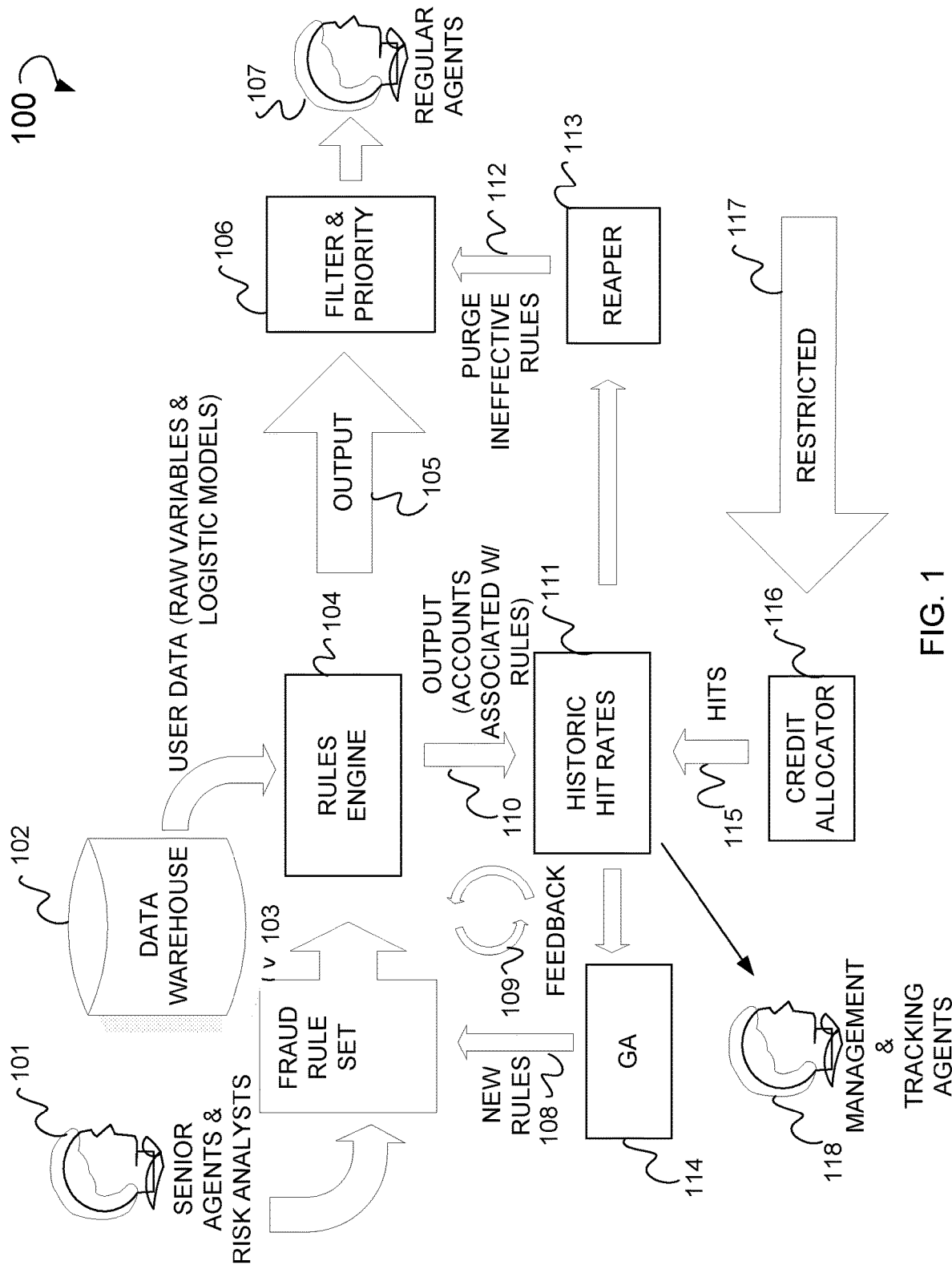
FIG. 1 is an example flow chart illustrating a high level overview of a method and system for fraud detection.

FIG. 1 is a flow chart 100 illustrating a high level overview of a method and system for fraud detection. Described in FIG. 1, is a senior agent & risk analysts 101 who creates a rule set 103 to be fed to a rules engine 104. Further, a data warehouse 102 may also feed data to the rules engine 104. The output of the rules engine 104, in the form of an output 105, is fed to a filter and priority module 106. The filter and priority module 106 provides output to a Regular Agent 107. The rules engine 104 provides output in the form of accounts associated with rules 110 to a historic hit rate module 111. The historic hit rate module 111 provides output to a reaper 113 which, in turn, purges (or culls) ineffective rules 112 and provides rules to the filter and priority module 106. The historic hit rate module 111 provides hit rate information go a genetic algorithm module 114 which in turn processes this historic hit rate information and provides new rules 108 back to a fraud rules set 103. Some embodiments describe the feedback loop 109 as continuing the cycle of the rules engine 104 by providing accounts associated with rules 110 to the historic hit rate module 111 and these historic hit rates being again provided to the genetic algorithm module 114. A Management and Tracking Agent 118 tracks the generation of the various rules via the genetic algorithm module 114. A restricted account output 117 is provided to a credit allocator module 116 which, in turn, provides credit values to rules via hit output 115. While some example embodiments may include the above flow chart illustrating senior Agents and Risk Analysts 101, Regular Agents 107 and Management and Tracking Agents 118, it is clear that the various functions of these individuals could be performed by one class of individual.

A Three-Tier Architecture

In some embodiments, one implementation may be as a distributed or non-distributed software application designed under a three-tier software architecture paradigm, whereby the various modules of computer code that make up the one implementation can be categorized as belonging to one or more of these tiers. A three-tier architecture is well known in the art. (See Applying UML and Patterns: An Introduction to Object-Oriented Analysis and Design and the Unified Process $2^{nd}$ Edition, by Craig Larman, Prentice Hall, 2002.) The first tier is an Interface level that is relatively free of application processing. The second tier is a Logic level that performs processing in the form of logical/mathematical manipulations (Logical Manipulations) of data inputted through the Interface level, and communicates the results of these Logical manipulations with the Interface and/or back-end or Storage level. Some example embodiments may include these Logical Manipulations relating to certain business rules or tasks that govern the application as a whole. These logical manipulations and associated business rules are used to generate, track and store fraud detection rules and related data within the E-commerce context. The Storage level is a persistent storage medium, or, some example embodiments may include non-persistent storage medium. One or more of these tiers may be collapsed into one another, resulting in a two-tier architecture, or one-tier architecture. For example, the Interface and Logic levels may be consolidated, or the Logic and Storage level may be consolidated, as in the case of an application with an embedded database. This three-tier architecture may be implemented using one technology, or as will be discussed below, a variety of technologies. These technologies may include one or more object-oriented programming languages such as, for example, Java™, C++, Delphi™ C#™ or the like. Additionally, structured programming languages such as, for example, C may also be used. Moreover, scripting languages such as, for example, Perl, Python, PHP, JavaScript or VBScript™ may also be used. This three-tier architecture, and the technologies through which it is implemented can be implemented in two or more computers organized in a server-client relationship, as is well known in the art, such that an Interface level resides on a client computer, whereas a Logic level resides on the application server (see below) and the Storage level resides on a database server (see below). As will be discuss more fully below, in such a relationship these three tiers can be implemented as various software components that communicate via distributed programming protocols. Some example embodiments may include these three tiers being implemented in a peer-to-peer configuration, with centralized or decentralized file and data sharing, or some other suitable file sharing paradigm, such that all three tiers reside on one or more computers and each computer retrieves files and data from one another. Peer to peer configurations are well known in the art. (See Computer Networking: A Top-Down Approach Featuring the Internet $2^{nd}$ Edition, James F. Kurose and Keith W. Ross, Addison-Wesley, 2003.)

In some embodiments, a set of potentially fraudulent transactions are examined by a Regular Agent 107 or other suitable person. The Regular Agent 107 looks for factual similarities amongst these transactions, similarities upon which a rule could be based. These similarities could include similar email information, bank financial information (e.g., a bank account number), or other similar information. Next a Regular Agent 107 generates a rule based upon these factual similarities using a GUI. During the course of generating this rule, the Regular Agent 107 may use plain text in the form of metadata to provide a plain text description of the rule, including, for example, contextually driven information related to the rule (e.g., goods purchased, buyer and seller information). This metadata may also include ID information for the particular fraud ID rule, ID information to be used in a fraud queue. Once the rule is created, is it parsed and placed into a data structure such as a Hash Table or other data structure with sub-linear performance (e.g., O(n log n)) such as a Heap, Binary Search Tree, Radix Tree, Black-Red Tree or other suitable data structure. All the rules taken together are known as the fraud rule set 103. Once a fraud rule set 103 is created, this set can be used to process batched data that is warehoused over a particular period of time, and/or online/real time data. Some example embodiments may include the processing of data including applying the rules to the data to determine whether the rules have been tripped or otherwise found to be true. Once a rule is found to be true, then the Rule ID and data in the form of an Account Number are stored together or separately in some type of persistent storage medium as, for example, a transaction type in a database table. Only the Rule ID information is stored.

Some example embodiments may include data being filtered via a filtering and priority module 106 working in combination with a Tracking Module. While this filtering process will be more fully discussed below, it suffices to say that a Hit Rate Table is generated to track the success of a rule over some predetermined period of time. This period of time can be predefined by a user, or can be determined automatically by the system. The rules that are not filtered are those rules and accounts which are flagged by these rules, for which there is some predetermined probability of fraud occurring based upon the rule being found to be true when applied to the account and facts underlying the account.

FIG. 2 is a user interface diagram showing a GUI 200, according to example embodiments, used to generate rules. Described is an Interface level as viewed via a web browser displaying hyper-text markup language (HTML), extensible-markup language (XML) or some other suitable markup language. Contained in this GUI are various text boxes, drop down menus, radio buttons, and other objects or widgets used for data input. The GUI 200 includes a text box 201 used to input the name of a new rule (e.g., Turing Ring, Church Ring or some other suitable name). A text box 202 is used to input the name of the owner or person or persons who authored the rule. A text box 203 is used to input a description of the rule. The GUI 200 may also include a drop down menu 204 to allow a user to choose the type of setting for the GUI 200 as a whole.

The GUI 200 may include a radio button 205 to allow a user to choose what setting they want, here a user can choose tracking mode or fraud queue (pictured but not referenced). Tracking allows a user to track the success of a particular rule, whereas the fraud queue setting allows a user to place the results of a particular rule into a fraud queue for analysis in addition to tracking the success of that rule. The GUI 200 may include a text box that allows a user to enter a suspect email address to match against the data found in a particular data set (e.g., match against an email address believe to be potentially fraudulent or involved in a fraudulent scheme).

The GUI 200 may also include a text box 207 to allow a user to enter in credit card information, which such information may be associated with a fraudulent account, of fraudulent scheme. A text box 208 allows a user to enter account data in the form of account type to match against a potentially fraudulent account. Example embodiments may further include a text box 209 into which a neural network score may be entered so as to allow a user to determine the applicability of a neural network model to be used to determine the existence of fraud. A spoof flag check box 212 is implemented to allow a user to flag an account as potentially spoofed (e.g., the subject of a fraudulent scheme). A text box 213 allows a potential rule to be compared against a particular fraud model.

Figure 3:
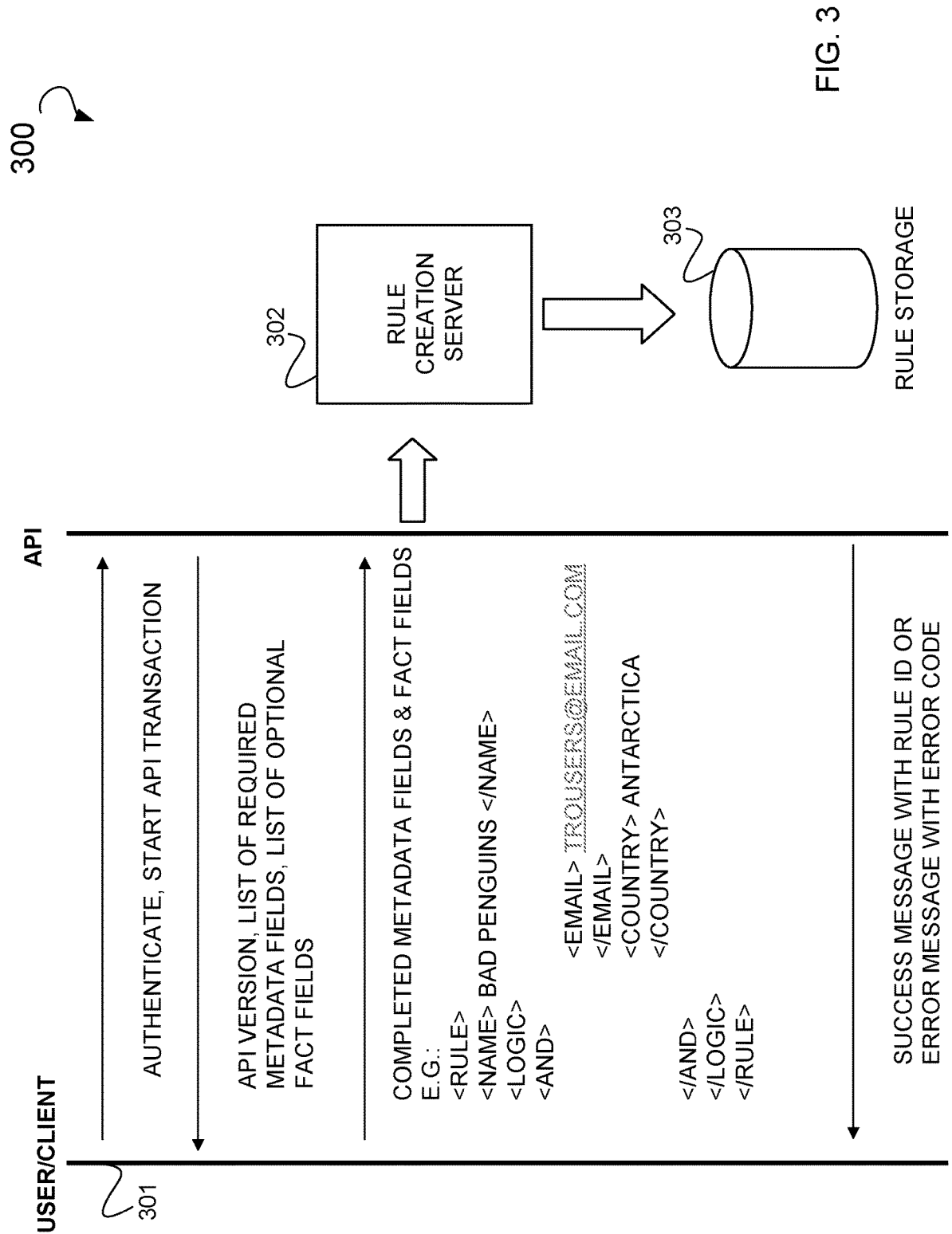
FIG. 3 is a sequence diagram illustrating operations of an Application Programming Interface (API) that allows for one to create applications (e.g., rules) to interface with the rules engine.

FIG. 3 is a sequence diagram illustrating operations 300, according to example embodiments, of an API that allows for one to create applications (e.g., rules) to interface with the rules engine 104. The operations 300 include a process 301 of accessing the rules engine 104 API. Also illustrated are various metadata fields that are provided to the rules engine 104. A rules creation server 302 creates rules obtained via the process outlined in the sequence 301, that are then stored in a rules storage 303 to be processed by the rules engine 104.

Figure 4:
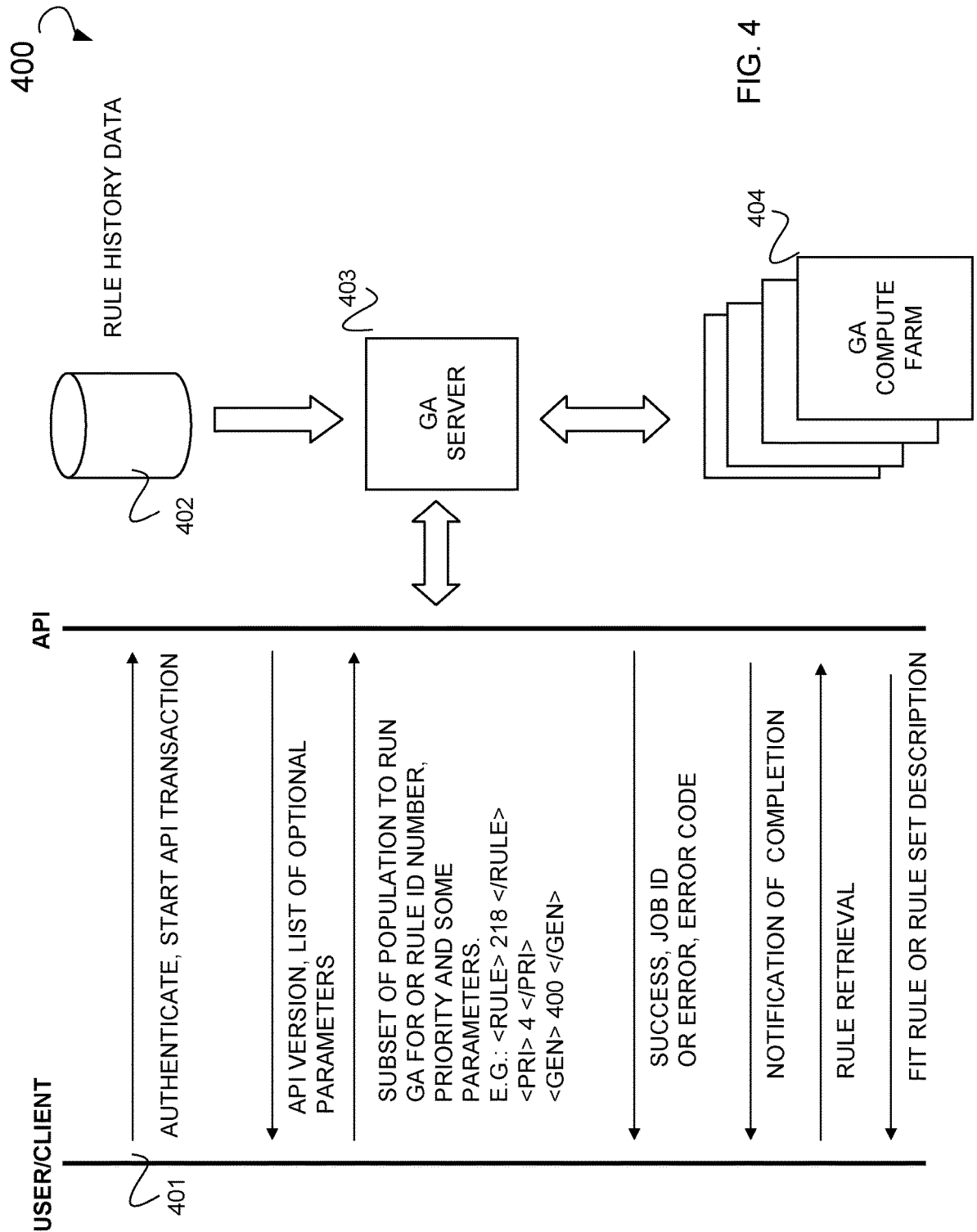
FIG. 4 is an example of a sequence diagram used to illustrate an API that allows for one to create applications that may be allowed to interface with the genetic algorithm module.

FIG. 4 is an example of a sequence diagram 400 used to illustrate an API that allows for one to create applications that may be allowed to interface with the genetic algorithm module 114. Described is a sequence 401 outlining the process for accessing the genetic algorithm module 114 API. Illustrated are various data parameters that are provided to the genetic algorithm module 114. This genetic algorithm module 114 resides on a genetic algorithm server 403, wherein the module 114 creates fit rules via the process outlined in the sequence 401. These fit rules are produced with the assistance of a GA compute farm 404.

An Interface Level

An example embodiment uses a client-based browser application, whereas other embodiments may be implemented via a command line interface. Some example embodiments may include an Application Programming Interface (API) implemented to allow one application to communicate with another. Some well-known client-based browser applications include Netscape Browsers™, Internet Explorer™, Mozilla Firefox™, Opera™ or some other suitable browser application. Common to these browser applications, is the ability to utilize a hyper-text transfer protocol (HTTP) or secured hyper-text transfer protocol (HTTPS) to get, upload (e.g., PUT) or delete web pages and interpret these web pages which are written in HTML and/or XML. HTTP and HTTPS are well known in the art, as are HTML and XML. (See XML for the World Wide Web, by Elizabeth Castro, Peachpit Press, 2000; Data on the Web: From Relations to Semistructured Data and XML $1^{ST}$ Edition, by Serge Abiteboul, Peter Buneman, & Dan Suciu, Morgan Kaufmann, 1999.) HTTP and HTTPS are used in conjunction with a TCP/IP protocol as described in the OSI model, or the TCP protocol stack model, both of which are well known in the art. (See Computer Networking: A Top-Down Approach Featuring the Internet $2^{nd}$ Edition, James F. Kurose and Keith W. Ross, Addision-Wesley, 2003.) The practical purpose of the client-based browser application is to enable a user to interact with the application through the display of plain text, and/or interactive, dynamic functionality in the form of buttons, text boxes, scroll down bars or other objects, widgets contained on one or more web pages constructed using the aforementioned HTML and/or XML.

Web pages are typically static or dynamic in nature. Those that are static typically display text as one would see it on a printed, physical page. Dynamic web pages, however, are interactive and allow for a user to input data, query data, and/or modify data just to name a few of the functionalities associated with dynamic web pages. The dynamic nature of web pages is a product of the use of the other technologies in combination with HTML and/or XML.

Some example embodiments may include using Java Server Page (JSP™), or Active Server Pages (ASP™ or ASP.NET™) (collectively server pages) to provide a user with dynamic web pages or content via their web browser. Additional technology may be implemented in the form of an additional program (e.g., routine) written in another programming language that is embedded into the HTML and/or XML code, allowing for web pages to become dynamic. Some of these additional technologies include, for example, embedded routines written in the Java™ programming language, the JavaScript™ language, or the VBScript™ programming language, or some other suitable programming language. These embedded routines are used to execute the aforementioned HTTP, HTTPS requests (e.g., GET, PUT, and DELETE) for web pages. Various types of programming structures such as branches, loops and other types of logic structures are used in such routines.

Some example embodiments may include, for example, a GUI used and implemented via a Java Servlet, Applet, or VBScript or C# form, or some other suitable programming language. The GUI may be written using the Perl programming language. As will be discussed below, web pages containing GUIs are stored at the Storage level, but executed at the Interface level via a web browser. These server pages contain objects such as text boxes, buttons, scroll-down bars, widgets, or some other suitable dynamic interface object. These objects, and the routines governing them, allow a user to retrieve, input, or delete content, just to name few of the functions. For example a user will be prompted with a new rule server page requesting the user to enter a new rule into a series of text boxes. These rules can be in the form of certain words associated together, words that make up information related to buyer or seller information on an E-commerce site. Once the new rule is entered, the rule will be sent to the Logic level, described below, where it will be stored for future use.

Figure 5:
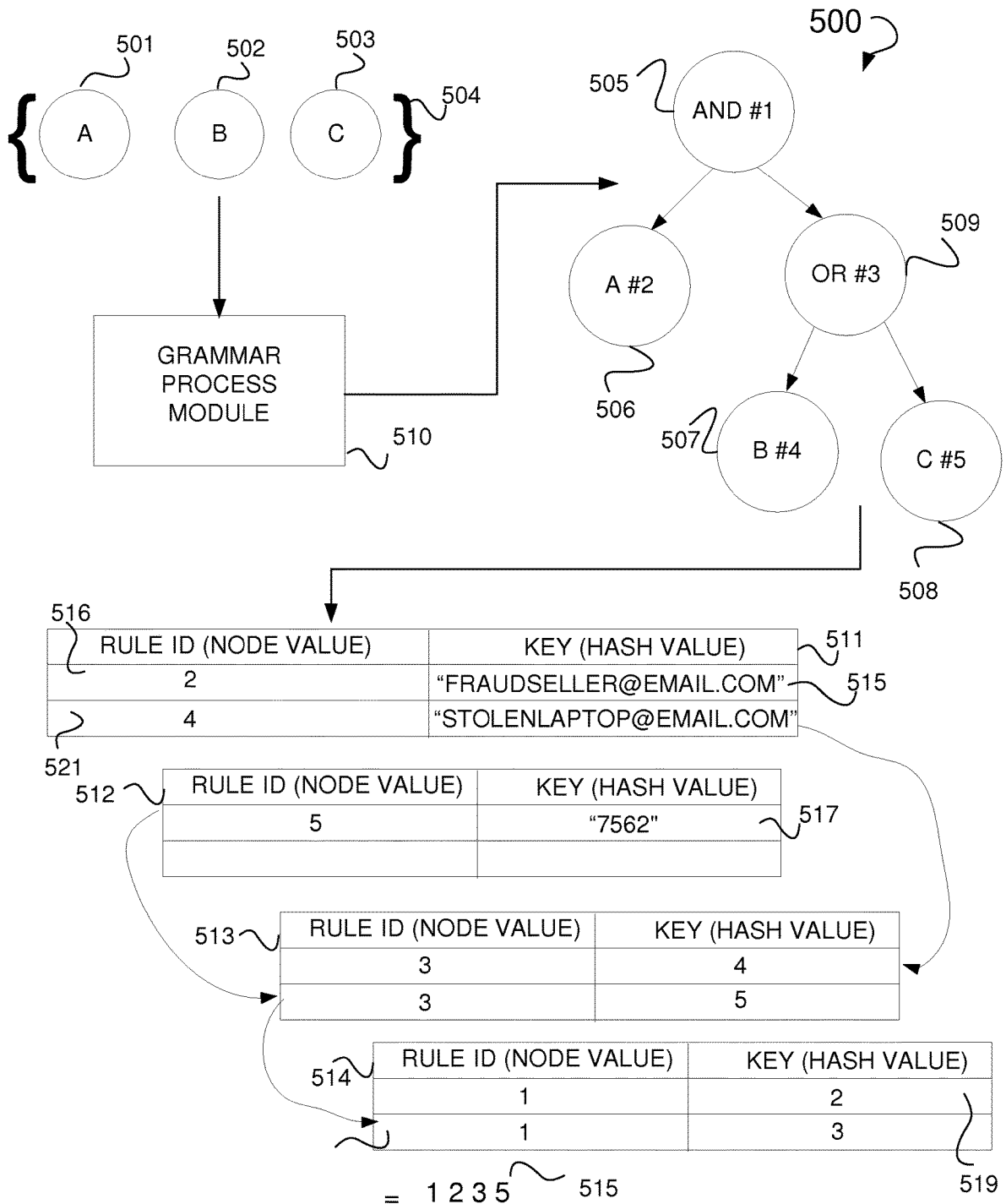
FIG. 5 is a flow chart illustrating a method to create a rule set.

FIG. 5 is a flow chart illustrating a method 500, according to an example embodiment, to create a rule set 504, to pass of the rule set through a grammar process module 510 and to process of the rule set by the grammar process module 510 into a parse tree and ultimately the insertion of this parse tree into some type of data structure. This rules set is a fraud rules set 504. Considering a specific example, a fraud rule set 504 may contain a rule 501, rule 502 and rule 503, wherein this rule set 504 that is passed to a grammar process module 510. This grammar processor 510 converts the rule 501, 502 and 503 into a parse tree using a predefined grammar. In one example, the parse tree may include a root node 505, a child node 506, another child node 509 and children of the child node 509 child node 507 and child node 508. This parse tree is then inserted into a data structure such as, Hash Table 511, a Hash Table 512, a Hash Table 513 and a Hash Table 514. The output of these Hash Tables is 1,2,3,5 described herein as 515. This 1,2,3,5 value is arrived at via a bottom up analysis wherein the Hash Key values of various Fragment Tables are examined. In one example. there is one Hash Table per class of variable (e.g., one table for Email info, one for Financial Info.). Corresponding to each of the values (e.g., 515, 517) within a particular Hash Table is a rule ID value (e.g., 518). This rule ID values is then used to map to other Hash values in other tables. These other tables are logic tables such as 513 & 514 reflecting logical "AND" and "OR" used combined values such as 515 & 517. Starting in a bottom up manner, one or more variables are mapped to their corresponding logic tables and value. This mapping corresponds to a subtree of the initial parse tree. These subtrees (e.g., 519), where applicable, are mapped to a root node (e.g., 505). In one example, "FRAUDSELLER@email.com" and "STOLENLAPTOP@email.com" OR Financial Info="7562" evaluate to 1,2,3,4. While here the Hash Table is inserted into a parse tree, in some other cases other types of data structures can be used such as, for example, a Red-Black tree, a Binary Search Tree or, for example, a Heap.

In some embodiments, the GUI 300 restricts the form by which a user can generate and enter rules into the system, such that the entries must reflect a particular grammar (see below). Some example embodiments may include the GUI allowing for a user to enter a rule in any logical form, and once entered these rules will be converted by the Logic level below into a form that can be processed by the particular grammar used by the system. This logical form will be a Boolean based algebra. Moreover the rules entered will be converted to the grammar used by the Logic level through performing various Boolean algebraic operations on the input.

Logic Level

Some example embodiments may include the above described Servlets, Applets, and/or VBScript forms being stored as server pages on one or more remote server computers connected to the client computer via an Internet. These remote servers can be a web server and/or application server. Web servers running JSP™ can include the Apache™/Apache Tomcat™ web server. Web servers running ASP™ can include a Microsoft Window Web Server 2003™ utilizing Internet Information Services (IIS). Application servers running JSP™ can include the Orion Application Server, or other J2EE™ certified application servers. Application servers running ASP™ can include Windows Server 2003™.

In some embodiments, the Logic level is governed by a scripting language that controls how and when certain web pages or pieces of content are provided to, or made accessible to, a particular user. This scripting language can be in the form of Java™, Perl, Python, or some other general purpose scripting language. For example, once the logic of a JSP determines that a particular object (e.g., a text box) on a web page has been executed (e.g., rules data has been entered and sent), the data from this text box is inputted, and sent to a web or application server. It is the routine written in a scripting language that determines whether, for example, the rules data is valid (e.g., that a properly constructed string has been entered). Some example embodiments may include the routine written in a scripting language to serve to retrieve data from a storage, data structure, or database level. The Storage level will be run by a separate database application, while, in other embodiments, a database embedded with a Logic level will be implemented.

In some example embodiments, a GUI implemented using the Perl programming language serves as an interface for a logic level written in an object oriented programming language such as C++, Java™, Delphi™, C#™ of some other suitable programming language. Some example embodiments may include a structured programming language such as C to implement the Logic level. This Perl implanted GUI may be located on a remote computer connected to another computer, in a client-server, peer-to-peer or some other suitable configuration. In some example embodiments, the routine written in, for example, C will retrieve data from a storage, data structure, or database level. Some example embodiments may include the Storage level being run by a separate database application, while in other embodiments a database embedded with a Logic level will be implemented. This separate database application will be located remotely on a separate computer, while, in other example embodiments, it will be located in the same computer.

In some embodiments, an Interface and Logic level is implemented to allow for the easy generation of various rules to be used in a Rule based modeling system used to detect fraud being committed on an E-commerce site. Some example embodiments may include the various tiers of review common to many fraud detection apparatus being replaced with fewer tiers, or even one tier of transaction review. In one embodiment, the Regular Agents 107 perform many of the same functions as Risk Agents, and more to the point, these Regular Agents 107 engage in actual rules generation (e.g., they create the rules for a rules based modeling System), as opposed to the Service Agents and Risk Analysts 101 generating such rules. Rules are generated for even one factual scenario (e.g., a single transaction) where the presence of fraud is believed to exist. In some example embodiments, rather than a testing bed being created and implemented by a Senior Agent and Risk Analysts 101 or others prior to the generation of the rules for a rules based modeling system, a Regular Agent 107 merely generates a rule and implements in the system. Some example embodiments may include rules to prevent fraud being generated on the fly, as needed by a Regular Agent 107 or other suitable person who directly examines transaction data for the a particular E-commerce site.

An Example Algorithm-Rules Engine

In some example embodiments, a rules engine 104 works together with a Tracking, Filtering and Priority Module and, in some embodiments, a Genetic Algorithm Module. Some example embodiments may include the rules engine 104 being used to create the rules and store the rules into some type of data structure. A method may be implemented including taking a stream of transaction data such as, for example, the combination of email information (e.g., "STOLENLAPTOP@email.com" or "FRAUDSELLER@email.com") data and particular financial number data (e.g., "7562" or "6788"), and generating a rule based upon this data. For example, every time the email information "STOLENLAPTOP@email.com" and the financial number "7562" appear in combination together in a transaction, a rule is activated and the account or transaction is flagged as potentially fraudulent. Other types of data could be used in conjunction with, or in lieu, of the above described email information and financial number data. For example the following types of information could be used to generate one or more rules: first name, last name, email address, credit card number, type of credit card, bank account number, account activity, account status, known bad information (e.g., using a credit card marked as stolen or lost), country of residence, transaction details, transaction history, fraud model hits, neural network scores, or some other suitable type of data. Some example embodiments may include the following neural networks: Kohonen self-organizing network, Recurrent networks, Simple recurrent networks, Hopfield networks, Stochastic neural networks, Boltzmann machines, Modular neural networks, Committee of machines, Associative Neural Network (ASNN), Holographic associative memory, Instantaneously trained networks, Spiking neural networks, Dynamic neural networks, Cascading neural networks, Neuro-fuzzy networks, or some other suitable neural network. In some example embodiments, a Hidden Markov model is used to generate data.

In some embodiments, the rules engine 104 operates based upon certain principles of compiler design and implementation as are known in the art. (See Compilers: Principles, Techniques, and Tools, by Alfred V. Aho, Ravi Sethi, Jeffrey D. Ullman, Addison Wesley, 1986.) Some example embodiments may include a grammar created with the Backus-Naur form (BNF) of:

```
<top level rule> ::= <and rule>
<and rule> ::= "(" <and rule> "AND" <and rule> ")" | <or rule>
<or rule> ::= "(" <or rule> "OR" <or rule> ")" | <fact rule>
<fact rule> ::= <email rule> | <financial information rule> | <model rule> ...
```

This grammar is an unrestricted grammar, while in other embodiments it is a context sensitive, context free, or regular grammar as is known in the art. (See An Introduction to Formal Language and Automata, by Peter Linz, Jones and Bartlett, 2001.) This grammar has complex expressions that allow for "ANDS" of "OR", but which do not allow for "ORs" of "ANDS". As noted above, rules are not limited to the types of data described in the above grammar (e.g., email information and financial information), but can be broader.

Some example embodiments may include this grammar being used to parse input in the form of user generated or machine generated (see discussion below relating to the genetic algorithm module 114) rules (e.g., a rules set) into one or more parse trees or some other suitable data structure with sub-linear performance. These rules are received via a GUI, whereas, in other embodiments, these rules are received via an API. These parse trees have the following characteristics: the leaf nodes are a rule, the leaf nodes are combined with a Boolean operator (e.g., "AND" or "OR") to form a subtree, the tree has a maximum depth of two (2) nodes, a tree can have an unlimited number of children and is not limited to being a Binary Search Tree, every subtree is internally considered to be a tree, every subtree has a rule of the grammar associated with it, there can be more than one parse tree implemented by, for example, the rules engine 104.

Some example embodiments may include each of these parse trees being evaluated in a bottom up manner starting with the leaf nodes. Specifically, for every subtree in the parse tree one or more data structures with sub-linear performance is created to store one more nodes of this subtree. In some cases, a Hash Table is used to store the parse tree and its various subtrees, whereas, in other embodiments, a Radix Tree, Binary Search Tree, Heap, or Red-Black Tree is implemented in lieu of, or, in combination with, the Hash Table. When viewed in terms of computational efficiency a Hash Table may be used instead of, for example, a Radix Tree, whereas, in other embodiments, the Radix Tree is, for example, may be used. This issue of which data structure to use may be based on an appreciation that while a Hash Table has amortized O(1) performance, for certain inputs (e.g., data sets) a Hash Table has O(n) performance. In such cases, a data structure such as, for example, a Radix Tree with actual O(2lgn) worse case performance may be used instead of a Hash Table.

Figure 6:
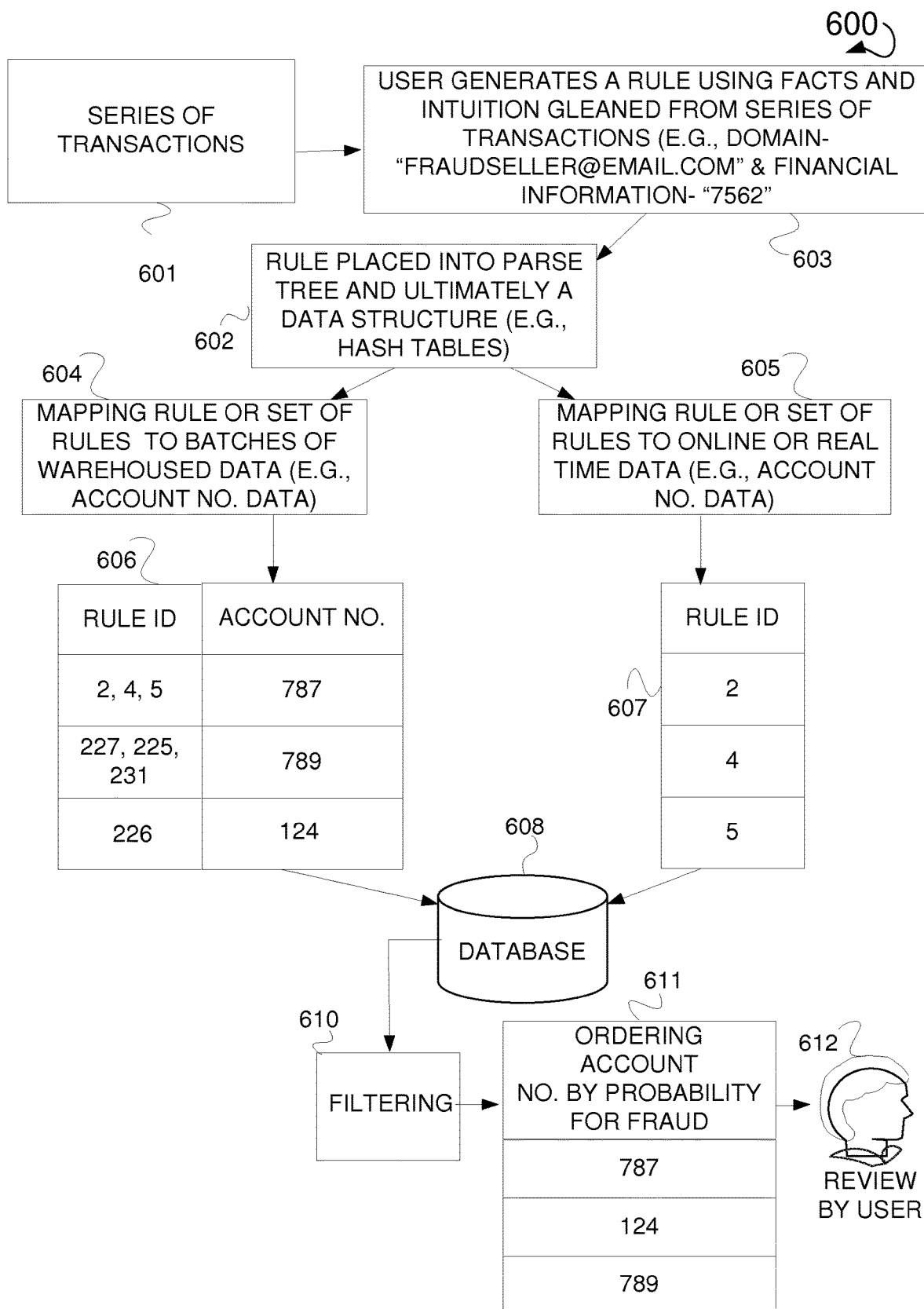
FIG. 6 is a flow chart illustrating a method to generate a rule.

FIG. 6 is a flow chart illustrating a method 600, according to example embodiments, to generate a rule, to store this rule, to map this rule to an account number, to store this mapping process, and to subsequently fit and audit account numbers by probability of fraud. A series of transactions process 601 is passed to a process 603 where a user generates rules using the facts contained in the series of transactions. These rules can be based on, for example, email information and/or financial information. This process 603 is then passed to a process 602 where rules are placed into a parse tree and then ultimately into a data structure. Some example embodiments may include a mapping 604 occurring where rules are mapped to sets of preexisting data, such as, for example, batches of warehouse account data. This account data can span seven days of transactions. Then, a mapping process 605 takes place where rules are mapped to online or real time data, such as, for example, account number data. A table 606 is generated with a rule ID column containing various values to denote particular rules is mapped to account numbers where the facts underlying the account may denote fraud. Further, a table 607 is described that contains rule ID information. These rule ID values are for rules that are applicable to the particular on line transaction. Moreover, the table 606 and table 607 may be stored in some type of persistent memory, such as a persistent memory-based database 608. Additionally, a filtering engine 610 takes data from the database 608. This filtering engine 610 passes filtered account information to a data structure 611, which orders this account information by the probability of fraud. A filter & priority module 106 may perform the functionality of the filtering engine 610. This data structure 611 is then passed to a user 612 for review.

In some embodiments, once each parse tree is stored into some type of data structure, such as a Hash Table, then the rule is applied to various transaction data. This transaction data may be in the form of warehoused data, or may be in the form of data occurring real time, such as, online data. In the case of warehoused data individual accounts may be evaluated to determine whether a particular account is deemed to be fraudulent based upon the application of a rules set. Some example embodiments may include individual transactions being evaluated to determine whether they are fraudulent by using the rules. Where a rule is evaluated as true (e.g., the account has factual characteristics supporting the application of the rule), the applicable rule is mapped (e.g., mapped by a Rule ID value) to the account number, or transaction number. This mapping this then stored into a persistent storage medium (see e.g., below description of Storage level) for future use.

FIG. 7 is a screen shot illustrating a user interface 700, according to example embodiments, to present information regarding success of a series of rules. Illustrated is a user interface 700 that is divided into various fields. The user interface 700 may include a field 701 that contains rule number information denoting the ID value of a particular rule. A metadata tag 702 is created to name a particular rule. An email address 703 is illustrated that denotes the author of the rule. Also illustrated is a percentage 704 that denotes the success of a rule in detecting fraud. Also shown to include an illustrator 705 that is used to illustrate the success of a rule on particular days. This illustrator 705 can be a color scale such that the more successful a rule, than the darker the color. For example, unsuccessful rules are denoted with a white color, vary with successful rules (<20%) yellow, more successful (<60%) red and very successful (>60%) bright red. Some embodiments describe a particular pattern (e.g., cross hatches) that denotes a rules success. A number 706 is used to denote the number of accounts flagged by a particular rule.

An Example Algorithm-Tracking Module

Some example embodiments may include implementing tracking functionality with the following characteristics: tracking is based upon the system as whole, the tracking interface allows for rule killing, the tracking module gives "credit" to a particular rule based upon the number of times a particular rule successfully flags a particular account as fraudulent. This functionality has the additional characteristics of tracking every subtree (e.g., rule) performance, including those rules not ultimately applied to flag an account or transaction as fraudulent. Additionally, this functionality allows for a user to test a particular rule, and it ability to detect a fraudulent account or transaction, without actually using the rule to flag or segregate out specific transactions. The hit rule module 111, or credit & allocation module 116 may implementing this functionality.

Some embodiments may include, a hit rule module 111 that contains a "Rules History Table" that allows for a user to compute the hit rate or success of a rule in flagging an account or transaction as fraudulent. The following is an example of such as table:

| Rule ID | Date ID | Number of Flags | Number of Hits |
|---|---|---|---|
| The identification value of the rule | The date the rule was created | The number of accounts flagged by the rule | The number of accounts that have been flagged by the rule and the rule actually credited for restricting the account |

A "Hit Rate Table" is generated, in part, from a "Rules History Table". Some characteristics of this "Hit Rate Table" include, for example, as alluded to above, rules that may be credited with detecting a fraudulent account or transaction, even if the rule is not given credit for restricting the account. The fact that credit is given, even in instances where the rule is not used as the primary basis for flagging a transaction, rewards users who write rules. The hit may be based upon a number or series of days, as opposed to the hit rate for a specific day. More to the point, given the ongoing nature of fraud, and the difficulty of discovery, credit for the discovery of the fraud is spread out over some specific time period, and a success rate attributed to the rule to reflect this time period. For example, if over a window of five (5) days, a rule detected one, and only one, account to be fraudulent for every single day, the rule may be credited for the last 3 days with a resulting hit rate of 60%. The following is a description of the "Hit Rate Table":

| Rule ID | Hit Rate for a Specific Time Period |
|---|---|
| 227 | 60% |

In some embodiments, the tracking module facilitates an open review paradigm, wherein it allows a user to review the relative success of all other users, wherein one, but not the only, measure of success is the whether or not the rules that a user has created have been successful in flagging or restricting fraudulent accounts or transaction. This may include users who do create successful rules being identified by the system for reward. This system creates a very egalitarian system of performance review, wherein success of a user is easily observed.

An Example Algorithm-Filtering and Priority Engine

In some embodiments, filtering and priority functionality is implemented with the following characteristics: it may use the "Hit Rate Table" to filter successful rules from unsuccessful rules, it may, filter based upon metadata descriptions supplied by a user at the time a rule is created, it may or may not filter based upon specific requests contained in a particular rule's metadata (e.g., a rule may contain a metadata tag that requests that the rule always be used and never filtered), it may de-duplicate the priority queue or other data structure used to store the flagged or restrict account or transaction such that any flagged account or transaction will only be flagged by one rule (e.g., that rule that is most successful in detecting the fraud present in the account or transaction), it may sort the rules in order of priority such that account with the greatest probability of fraud will be at the top of the queue. Some example embodiments may include the filter & priority module 106 and reaper 113 being used to implement this functionality.

Some embodiments may include, a reaper 113 that removes ineffective rules (e.g., rules that have shown a history of being unable to detect fraudulent accounts or transactions). The reaper 113 merely prevents an unsuccessful rule from being used by the system for the actual flagging of an account or transaction. Despite this, such a rule can accrue a value in the "Rules History Table" or the "Hit Rate" table, but will not be allowed serve as the basis for restricting an account. The purpose of still allowing an ineffective rule to be used for the purpose of accruing, for example, a hit rate is so that when a fraud scheme arises that the previously ineffective rule could detect, then the hypothetical success of the rule could be determined and the rule can be re-activated for use.

In some embodiments, once an account or transaction is placed into the queue, it is considered ready for human review. One example embodiments may include more than one queue being used such that queues, and the transactions that they contain, can be segregated based upon the expertise of the human reviewer. For example, flagged transactions arising from Antarctica, can be placed into a queue for review by people with an expertise in Antarctica. And again, flagged accounts arising from North Korea, can be placed into a queue for review by people with an expertise in speaking or who are knowledgeable about North Koreans.

An Example Algorithm-Genetic Programming Algorithm

Some example embodiments may include a code module (e.g., genetic algorithm module 114) implementing principles of Genetic programming being employed to generate the most "fit" rules based upon the goals of a particular user. This code module may use a library written in the C programming language called Lilgp. In general, Genetic programming involves concepts of: initialization, selection, reproduction and ultimately termination. As with many biological based systems there is a notion of natural selection and fitness with only the most "fit" species in a particular biological system surviving. It is through this same notion of fitness, applied in the present context that only the most "fit" rules are allowed to survive. The term "fit" may include the following definition:

Let O be the set of all rules combined together into islands of trees (e.g., a set of trees) via various Boolean operations;

Let R be the set of all restricted accounts (e.g., accounts for which fraud is believed to exist) for a particular time period;

Let Ai be the set of accounts found by the ith tree in O

Then take $(|Ai \cap R|)/|Ai|$=as hit rate for the ith tree in O. The term "fit" can be described by a second definition of fitness that takes into account certain economic considerations. For example, the notion of a "fit" rule can be based upon the return on investment generate by the rule (ROI). For example:

Let O be the set of all rules combined together into islands of trees (e.g., a set of trees) via various Boolean operations;

Let R be the set of all restricted accounts (e.g., accounts for which fraud is believed to exist) for a particular time period;

Let Ai be the set of accounts found by the ith tree in O

Let $\lambda$ be the minimum expected savings in finding a restricted account;

Then take $(|A_i \cap R|)*\lambda-|A_i|=$ a return on investment amount from the ith tree in O.

Clearly, ROI is not the only criterion (economic or otherwise) that could be used to define whether a function is "fit". Other criterion such as overall savings, saving for a particular time period, or some other suitable economic criterion may also be used to describe a "fit" rule.

In addition to the definition of whether a rule is "fit", there are additional concepts that are defined in some embodiments of the present system. For example there is a concept of "crossover" and one of "mutation". These concepts generally relate to the above referenced concept of reproduction. As will be more fully described below, "crossover" involves taking two trees from the same or different islands of trees, randomly picking a leaf node (e.g., a rule) or a subtree, and swapping this subtree with a randomly picked subtree from a different tree on the same or different island of trees. Randomness may be achieved using a pseudo-random number generator. In one further embodiment, "crossover" results in two new trees are generated for every two parents. A tree can be a single leaf (e.g., a rule).

Figure 8:
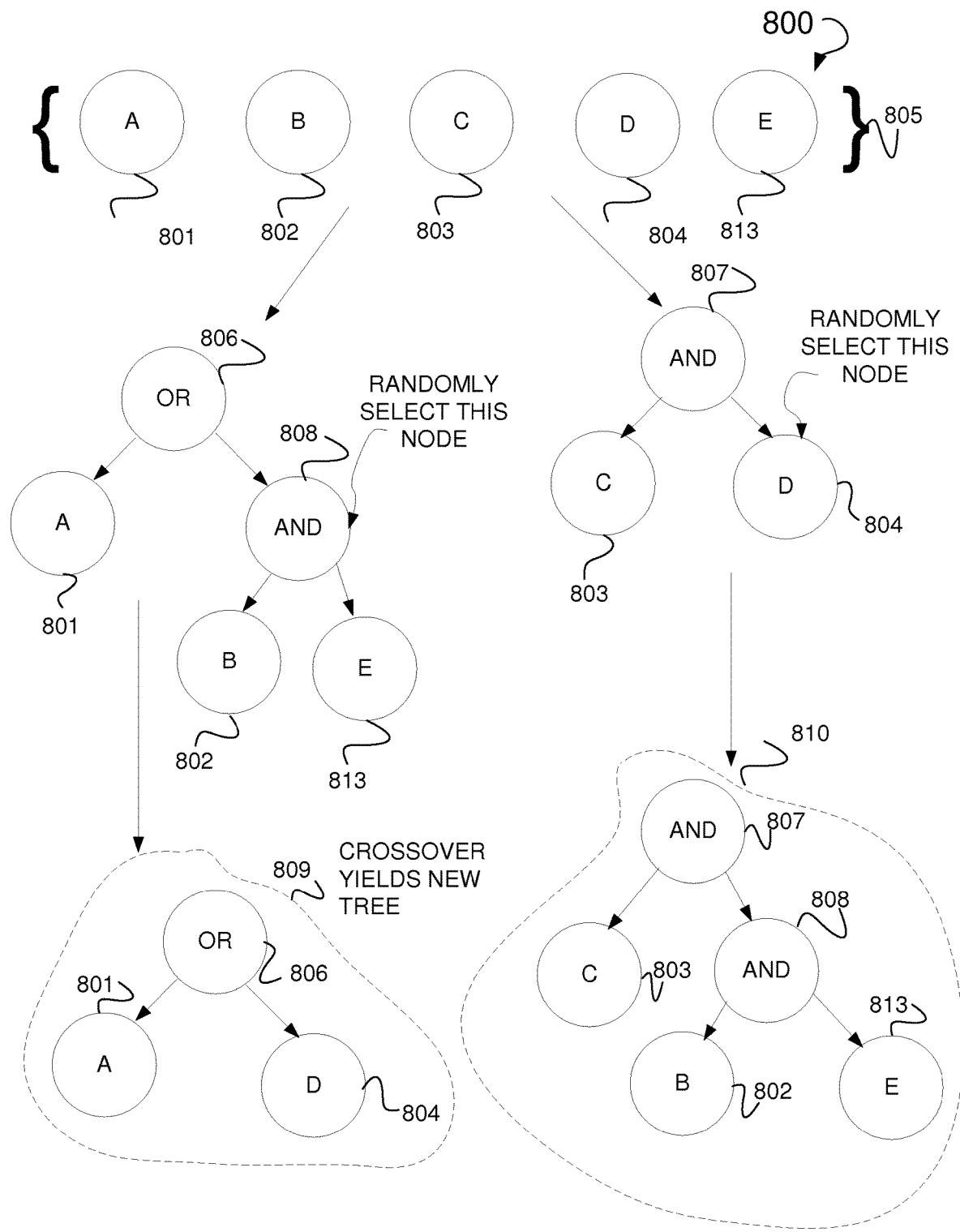
FIG. 8 is a tree diagram illustrating "crossover".

FIG. 8 is a tree diagram 800 illustrating "crossover". Some example embodiments may include a rules set 805 containing members 801, 802, 803, 804 and 813. In one example, a tree is illustrated with a root node 806, a child node 801, and another child (e.g., subtree) 808 with a child node 802 and 813. A second tree with a root node 807 is illustrated with a child 803 and a child 804. An algorithm may be used to randomly select a node on the tree denoted with the root node 806, and a second node on the tree denoted with the root node 807. A child 808 may be randomly selected, whereas a child 804 is randomly selected. A new crossover tree 809 may be produced that contains the child node 804, and accompanying root node 806 and child 801, which replaces the child node 808 and its children 802 and 813. A new child tree 810 is illustrated that contains a new child node 808, and children 802 and 813, that replaces child node 804.

Figure 9:
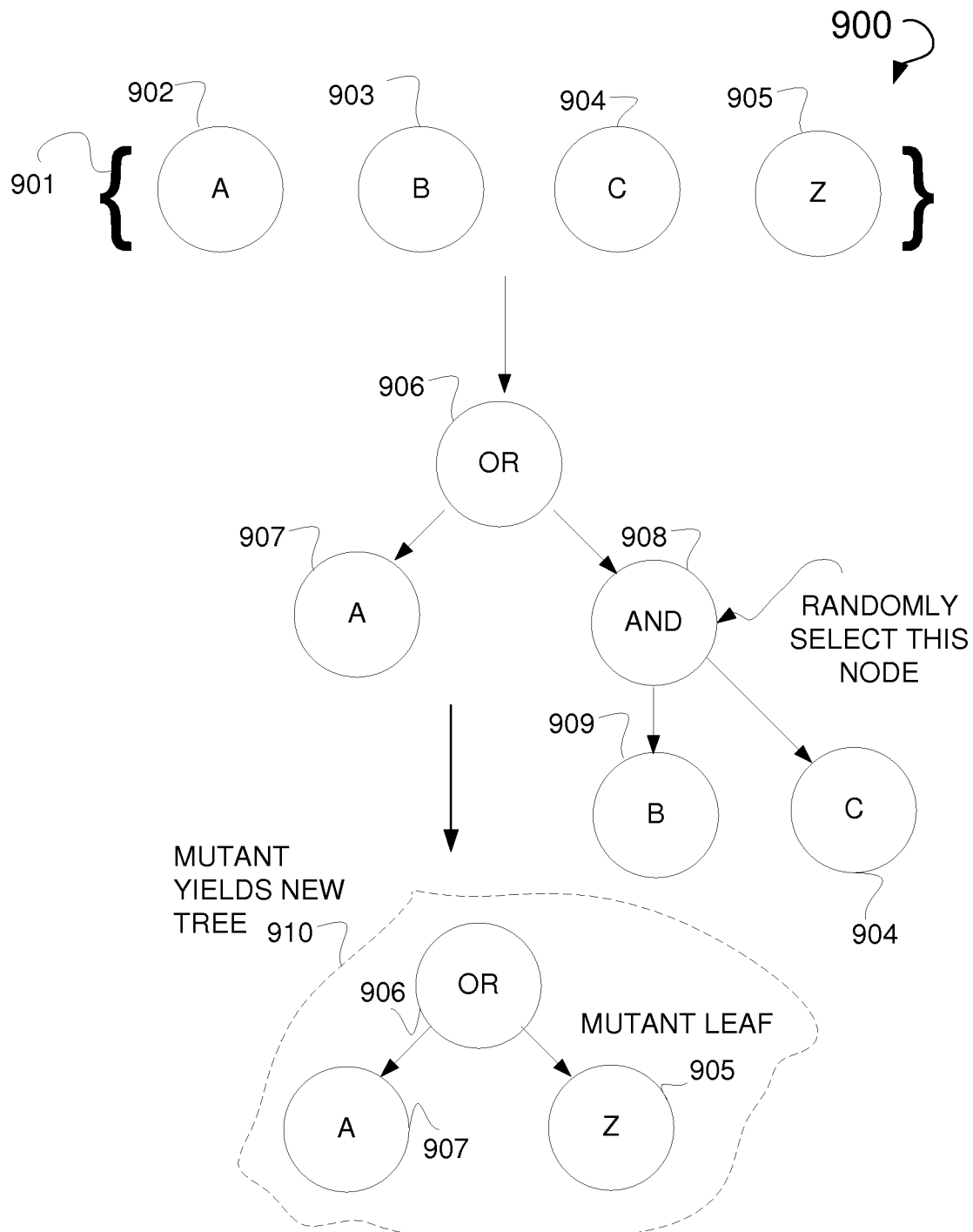
FIG. 9 is an example tree diagram illustrating "mutation."

FIG. 9 is a schematic diagram illustrating a mutation process 900, according to an example embodiment. A set 901 containing members 902, 903, 904, 905 is illustrated. These various members or rules are used to generate a tree with a root node 906, a child 907, a child 908, and a child 909. Some example embodiments may include the process of mutation, through which a new child tree 910 is created with a new child node 905. Some embodiments include, a pseudo-random number generation algorithm is used to randomly select a node (e.g., 908). This node, and it children, is then replaced with a randomly selected leaf (e.g., 905) to create a new child tree (e.g., 910). A tree can being single leaf (e.g., a rule). Randomness is achieved using a pseudo-random number generator, and the result of "mutation" is a child tree for every parent tree.

Figure 10:
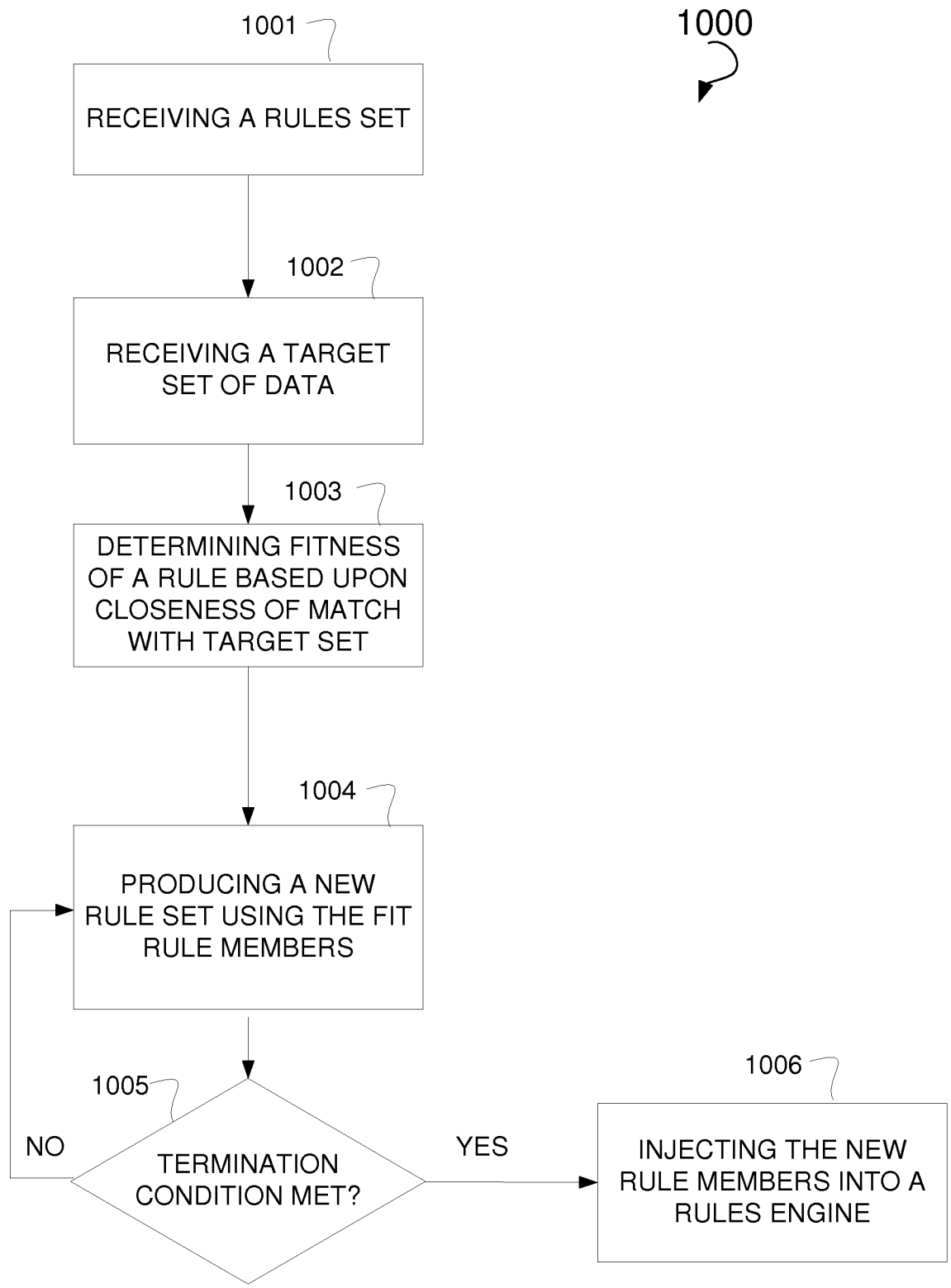
FIG. 10 is an example flow chart illustrating where a genetic algorithm module is implemented.

FIG. 10 is a flow chart illustrating a method 1000, according to an example embodiments, to perform genetic programming. The method 1000 includes a process 1001 that receives a rule set and a process 1002 that receives a target set of data. This process 1001 may be implemented with the rules engine 104 illustrated above. In some further embodiments, the process 101 may be implemented via the GUI 200 whereby rules are manually generated by, for example, Senior Agents and Risk Analysts 101 via the GUI 200 and provided to the rules engine 104 and the process 1001. A process 1003 determines the fitness of each rule in the population based on how closely the data captured by that rule matches the target data. The historic hit rates module 111 could be used to implement the process 1003. A process 1004 is used for producing new rule members using the fit rule members as determined by process 1003, and subjecting them to crossover, mutation or other changes. This process of selection is repeated and continues for a number of iterations or generations. Additionally, migration may occur between various islands or trees of data structures after so many iterations. The genetic algorithm module 114 could be used to implement this process 1004. A decisional process 1005 occurs after a predefined number of iterations and/or migrations between islands of trees, and can be implemented via genetic algorithm module 114. Once new rules are generated via crossover and/or mutation these new rules, and the parent rules that created them, genetic algorithm module 114 is used to inject these rules back into the rules engine 104 via a process 1006.

In some embodiments, a rule set is received from, for example, a user, Genetic programming algorithm, a group of users using the rule set authored by them over a time period or other suitable source. This rule set is mapped to account data, and the set of account numbers flagged by that rule are stored into some type of persistent or non-persistent data structure. These accounts then constitute a target set (e.g., fraudulent accounts for the particular fraud that sought to be detected). A population is then created by generating rule trees by taking random logical combination (e.g., unions and intersections) of the rules from the initial rules set. For each rule tree in the population, the rule tree is executed (e.g. applied to a data set including, for example, account information) to determine the set of accounts captured by the rule tree (e.g., stepping through the tree taking the union and the intersections of component rules). Moreover, for each rule tree in the population, the fitness of the rule tree is computed by taking the intersection of the set of accounts determined from the set of accounts captured by the tree (see above) and the set of accounts used as the target. The resulting rule trees are ranked according to their fitness. Furthermore, a new population of trees is created by applying cross-over and mutation to the top ranking trees. The notion of what constitutes a top ranking tree is based upon some predetermined percentage value such as, for example, the top 10%, 20%, 30%, 40%, or even the top 50%. This value can be manually determined by a user, or automatically determined by a computer system. If a termination condition is met, then the resulting new fit tree or set of trees is injected back into a rules engine such as, for example, rules engine 104. A termination condition can occur after a set number of iterations or migration as referenced elsewhere herein. Where a termination condition is not met, then the step of stepping through the tree taking the union and the intersections of component rules is repeated, as are the steps subsequent to this step.

In some embodiments, as with other natural selection based systems, the Genetic programming as employed has certain additional characteristics. For example the most "fit" tree survives and is not subjected to "mutation", or "crossover". This is known as "elitism". Moreover, some example embodiments may include a new set of child trees being generated through "crossover", "mutation," and these trees are used to replace the most unfit trees. So if, for example, "N" new trees reproduced via crossover, "N" unfit trees are replaced. With regard to the "mutation", only a defined percentage of trees are ever mutated.

Applying these various concepts in the present context, in some embodiments, a user (e.g., a Regular Agent 107) will choose a particular rule, apply the concepts of "crossover" and mutation" to discover fit rules that describe a set of accounts that most closely match the set of fraudulent accounts in the chosen rule, and inject the new fit rules back into the system for use by the system in combination with, or separately from, various human created rules. Some example embodiments may include the initial choice or a particular rule being based upon the goals that the user is attempting effectuate. For example, if the user is looking to generate rules relating to accounts held by people from Antarctica, then the user will create a rule or select a rule such as "all accounts held by people from Antarctica". The system will then find the intersection between this rule, and all restricted accounts (e.g., accounts where fraud was found to exist). Logically, this can be presented in the following manner:

Let L be the rule namely the set of "all accounts held by people from Antarctica";
Let R be the set of all account determined to be restricted;
L∩R=R', where R' is the subset of all restricted /bad accounts that are held by people from Antarctica.

Once this subset R' is created, the GP module (e.g., genetic algorithm module 114) will proceed to discover the most effective or fit rules that best capture the data in R' by using the process of FIG. 8 using R' as the target set in 802. These new rules will be discovered through the iterative application of the processes of crossover and mutation to the fit members of the population. Once these various processes are applied a plurality of times the fit new rules are injected back into the system. Some example embodiments may include "crossover" and "mutation" occurring over a number of generations, iterations. For example the "crossover" and "mutation" process can be repeated 100, 200, 300, 400, 500, 600, or even 1000 times prior to being injected back into the system. Moreover, as with natural systems, there is a concept of "migration" described and implemented. Specifically, after every so many iterations, trees and subtrees from one set or island is allowed to reproduce (e.g., "crossover" and/or "mutate") with trees and subtrees from another set or island. For example, in some embodiments, after every 20, 30, 40, 50, 60, 70, or even 100 iterations "migration" is allowed between sets or islands of rules. Injecting these rules back into the system allow for experimentation with new rules at a pace faster than these rules can be created by humans, or more conventional means (e.g., the generation of rules and use of these rules in various testing scenarios, test beds or the like). Once the reproduced rules are created, the user receives a file containing all the new reproduced rules combined into a tree form with various Boolean operators. The user, at this point, may decide whether or not to manually inject these rules back into the system.

Storage Level

Some embodiments may include a Storage level that is implemented whereby tables of data are created, and data is inserted into, selected from, these tables using a structured query language (SQL) or some other database-related language known in the art. (See The Fundamentals of Database Systems $3^{rd}$ Edition, by Remez Elmasri & Shamkant B. Navathe, Addison-Wesley, 2000.) These tables of data can be managed using a database application such as, for example, MySQL™, SQLServer™, Oracle 8i™ or 10g™, or some other suitable database application. These tables are organized into a relational-database schema (RDS) or object-relational-database schemas (ORDS), as is known in the art. (See Id.) These schemas can be normalized using certain normalization algorithms so as to avoid abnormalities such as non-additive joins and other problems. Additionally, these normalization algorithms include Boyce-Codd Normal Form or some other normalization, optimization algorithm known in the art. (See Id.)

In some embodiments, various types of tree data structures are used to organize data for the purposed of searching. These tree data structures include Radix Trees, Red-black trees, Binary Search Tree, Heaps, or some other suitable data structure as is known in the art. (See Algorithms in C++ $3^{rd}$ Edition: Parts 1-4, Robert Sedgewick, Addison-Wesley, 1998.) Some other type of data structure may be used such as a One or Multi-Dimensional Array, Hash Table, Link List, Queue, Stack, or some other suitable data structure as is known in the art. (See Id.) Once implemented, these data structures can then be searched using a divide and conquer, or other search methods well known in the art. (See Id.)

Figure 11:
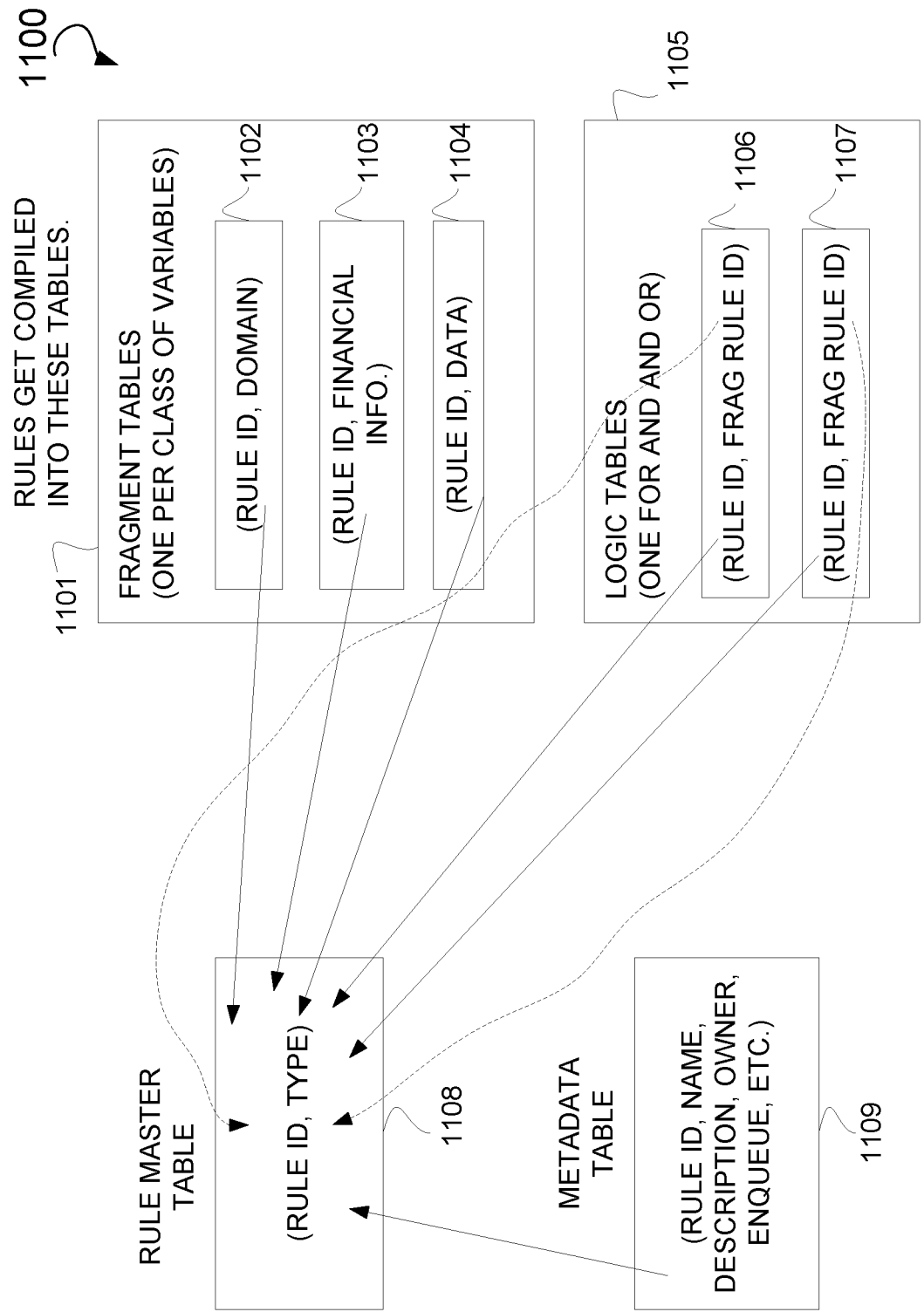
FIG. 11 is an example schema illustrating generation of a Rule Master Table from a variety of database tables.

FIG. 11 is a schema 1100 illustrating the generation of a Rule Master Table. Some embodiments describe a series of tables 1101 that contain various types of fragments of classes with one class per variable rule. This series of tables 1101 has a subtable 1102 containing a rule ID in an email information. A subtable 1103 contains a rule ID and financial information. Further, a subtable 1104 that contains a rule ID and data. Additionally, a collection of logic tables 1105 contains a subtable 1106 containing a rule ID and fragment rule ID. Moreover, this logic table 1105 also contains a subtable 1107 containing a rule ID in fragment rule ID. A metadata table 1109 contains various types of data in the form of, for example, rule ID, name, description, owner, and co-enqueue values. Additionally, a master rule table 1108 that takes data from the aforementioned tables (e.g., 1101, 1105 & 1109) and subtables (e.g., 1103, 1103, 1104, 1105, 1106) and generates a table containing a rule ID and type, where the type value is composed of, for example, rule IDs from the various aforementioned subtables.

Figure 12:
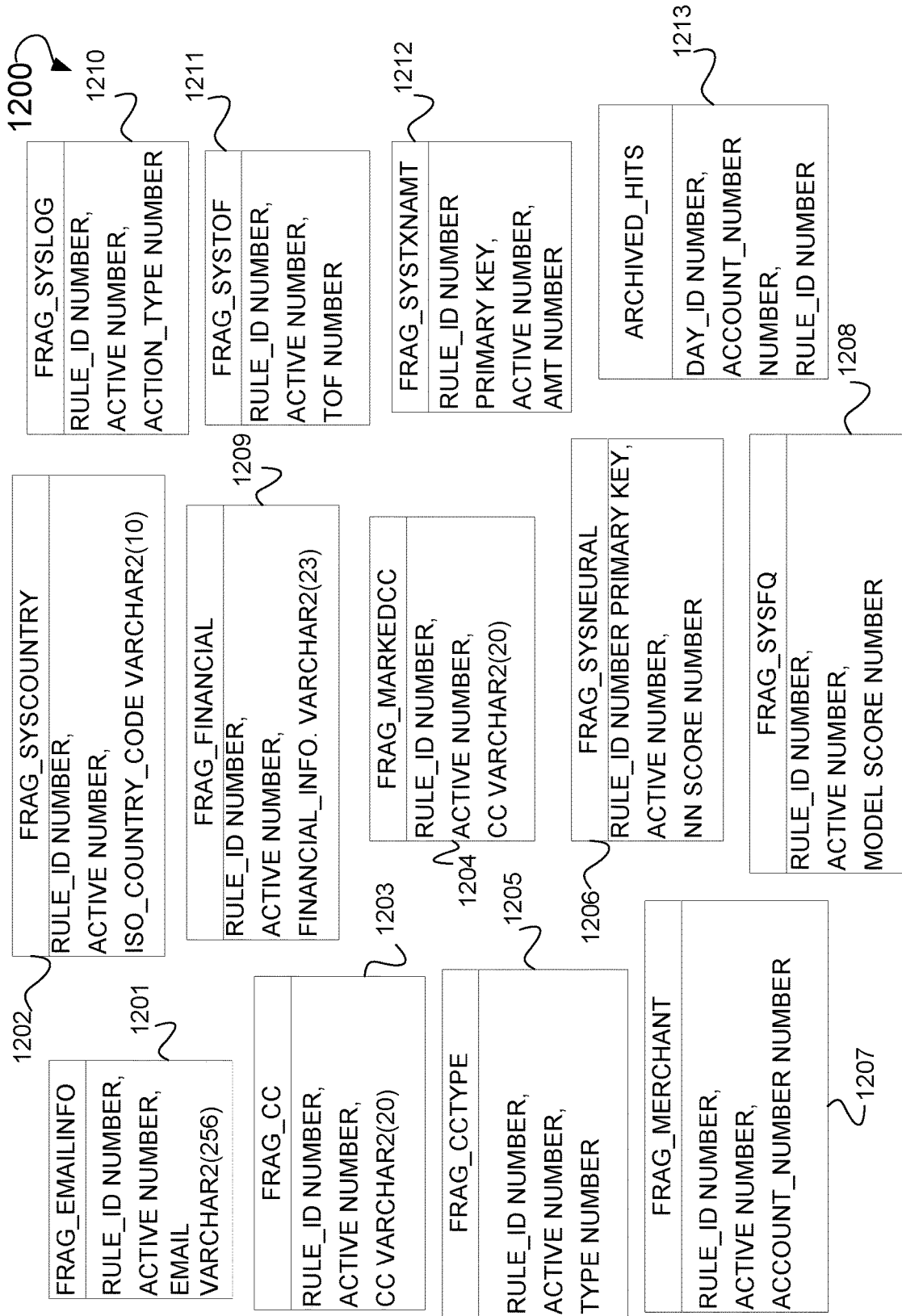
FIG. 12 is an example schema illustrating various database tables.
Figure 13:
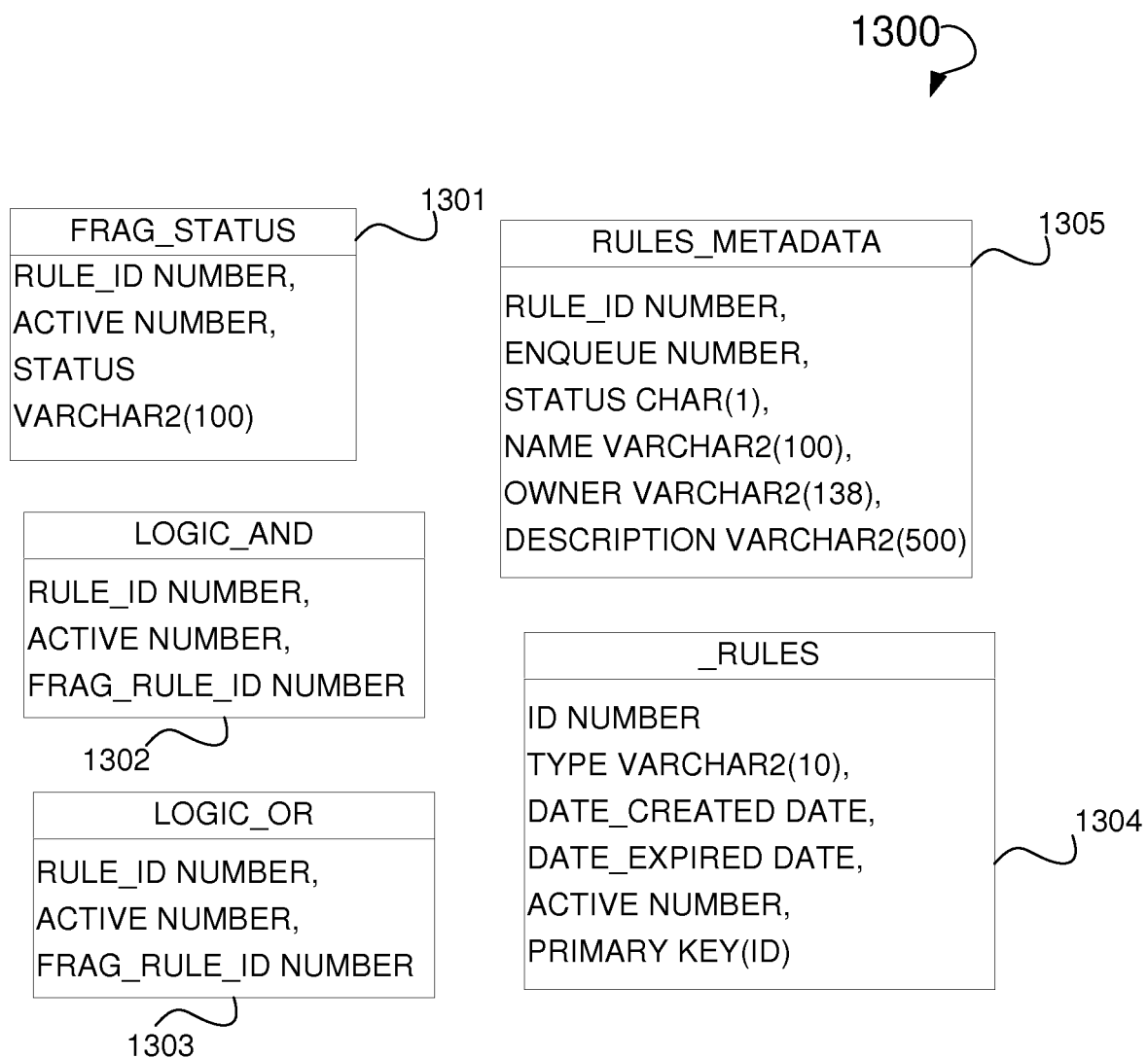
FIG. 13 is an example schema illustrating various database tables.

FIGS. 12 and 13 are schemas 1200 and 1300 respectively illustrating various database tables. In some embodiments, the various database tables describe herein contain a plurality of tuples, with each tuple composed of a row of data. Various data types are used to define the data contained in these tuples. Data types include: number, strings, integers, doubles, floats, binary large objects (BLOB), character large objects (CLOB) or some other data type known in the art. (See The Fundamentals of Database Systems 3rd Edition, by Remez Elmasri & Shamkant B. Navathe, Addison-Wesley, 2000.) In addition, a frag_emailinfo table 1201 is implemented that contains a rule ID number, and active number, and an email value which is a variable char data type. A frag_syscountry table 1202 is implemented that contains a rule ID number field, an active number field and an ISO country code field which is a variable char data type. Further, a frag_cc table 1203 is implemented that contains a rule ID number field, an active number field, and a cc field which is a variable char data type. A frag_markedcc table 1204 is implemented that contains a rule ID number field, an active number field and a cc field which is a variable char data type. A frag_cctype table 1205 is implemented that contains a rule ID number, an active number field, and a type field that is a number data type. Additionally, a frag_sysneural table 1206 is implemented that contains a rule ID number as a primary key, an active number field, and a nn_score number field. Further, a frag_merchant table 1207 is implemented that contains a rule ID number field, an active number field, and an account number field. Moreover, a frag_sysfq table 1208 is implemented that contains a rule ID number field, an active number field, and a model_score field which is a number data type. A frag_financial table 1209 is implemented that contains a rule ID number field, an active number field, and a financial information field, which is a variable char data type. A frag syslog table 1210 is implemented that contains a rule ID number field, an active number field, and an action type number field. Further, a frag_systof table 1211 is implemented that contains a rule ID number field, an active number field, and a tof number field. In addition, a frag_systxnamt table 1212 is implemented that contains a rule number field, a primary key, which serves as the primary key, an active number field, and an ATM number field. An archived hits table 1213 is implemented that contains a day ID number field, an account number field, a number and a rule ID number field.

FIG. 13 is a schema 1300 of various database tables. Some example embodiments may include a frag_status table 1301 being implemented that contains a rule ID number field, an active number field, and a status field which is a variable char data type. Moreover, a logic_and table 1302 is implemented that contains a rule ID number field, an active number field, and a frag_rule_id number field. A logic or table 1303 that contains a rule ID number field, an active number field, and a frag_rule_id number field is implemented. A rules table 1304 is implemented that contains an ID number field, a type field, which is a variable char data type, a data created field, a date expired field, and an active number field, which serves as the primary key value. A rules_metadata table 1305 is implemented that contains a rule ID number field, an enqueue number field, a status field which is a char data type, a name field which is a variable char data type, an owner data field which is a variable char data type, and a description data field which is a variable char data type.

Component Design

Some example embodiments may include the above described three (3) tiers or levels being written as one or more a software modules with each module contributing to the functionality of each level or tier. Common too many of these modules is the ability to generate, use and manipulate the above described data and data sets. These modules, and associated functionality, may be used by either the client, server, or peer applications. These various modules can be implemented into the system on an as-needed basis. These modules may be written in an object-oriented-computer language such that a component oriented or object-oriented programming technique can be implemented using, a Visual Component Library (VCL), Component Library for Cross Platform (CLX), Java Beans (JB), Java Enterprise Beans (EJB), Component Object Model (COM), or Distributed Component Object Model (DCOM) or other suitable technique. These modules are linked to other modules via various APIs and then compiled into one complete server and/or client application. The process for using modules in the building of client and server applications is well known in the art. (See Component Based Software Engineering: Putting the Pieces Together, by George T. Heineman and William T. Council, Addison-Wesley, 2001; Delphi Component Design, by Danny Thorpe, Addison-Wesley, 1996.) Further, these modules, and the tiers that they make up, are linked together via various distributed programming protocols as distributed computing modules.

Distributed Computing Modules

Some example embodiments may include remote procedure calls being used to implement one or more of the above described levels of the three-tier architecture across a distributed programming environment. For example, a Logic level resides on a first computer system that is remotely located from a second computer system containing an Interface or Storage level. These first and second computer systems can be configured in a server-client, peer-to-peer or some other configuration. These various levels can be written using the above described component design principles, and can be written in the same programming language, or a different programming language. Various protocols are implemented, to enable these various levels, and components contained therein, to communicate regardless of the programming language used to write these components. For example, a module written in C++ using COBRA or SOAP can communicate with another remote module written in Java™ These protocols include Simple Object Access Protocol (SOAP), and the Common Object Request Broker Architecture (CORBA) or some other suitable protocol. These protocols are well-known in the art. (See The CORBA Reference Guide: Understanding the Common Object Request Broker Architecture, by Alan Pope, Addison-Wesley, 1997.)

A System of Transmission Between a Server and Client

In some embodiments, the above described components that make up the platform architecture communicate using the OSI or TCP/IP protocol stack models for defining network protocols that facilitate the transmission of data. Applying these models, a system of data transmission between a server and client computer system can be described as a series of roughly five layers comprising as a: physical layer, data link layer, network layer, transport layer and application layer. (See Open System Networking: TCP/IP and OSI, by David M. Piscitello & A. Lyman Chapin, Addison-Wesley, 1993.) Some example embodiments may include the various levels (e.g., the Interface, Logic and Storage levels) residing on the application layer of the TCP/IP protocol stack. The present application may utilize HTTP to transmit content between the server and client applications, whereas in other embodiments another protocol known in the art is utilized. Content from an application residing at the application layer is loaded into the data load field of a TCP segment residing at the transport layer. This TCP segment also contains port information for a recipient application a module residing remotely. This TCP segment is loaded into the data field of an IP or UDP datagram residing at the network layer. Next, this IP datagram is loaded into a frame residing at the data link layer. This frame is then encoded at the physical layer and the content transmitted over a network such as an Internet, local area network (LAN) or wide area network (WAN). The terms Internet refers to a network of networks. Such networks may use a variety of protocols for exchange of information, such as TCP/IP, ATM, SNA, SDI, etc, and may be used within a variety of topologies or structures. This network may include a code sensing multiple access network (CSMA) such an Ethernet based network. This network may include a code divisional multiple access (CDMA) network, or some other suitable network.

Platform Architecture

Figure 14:
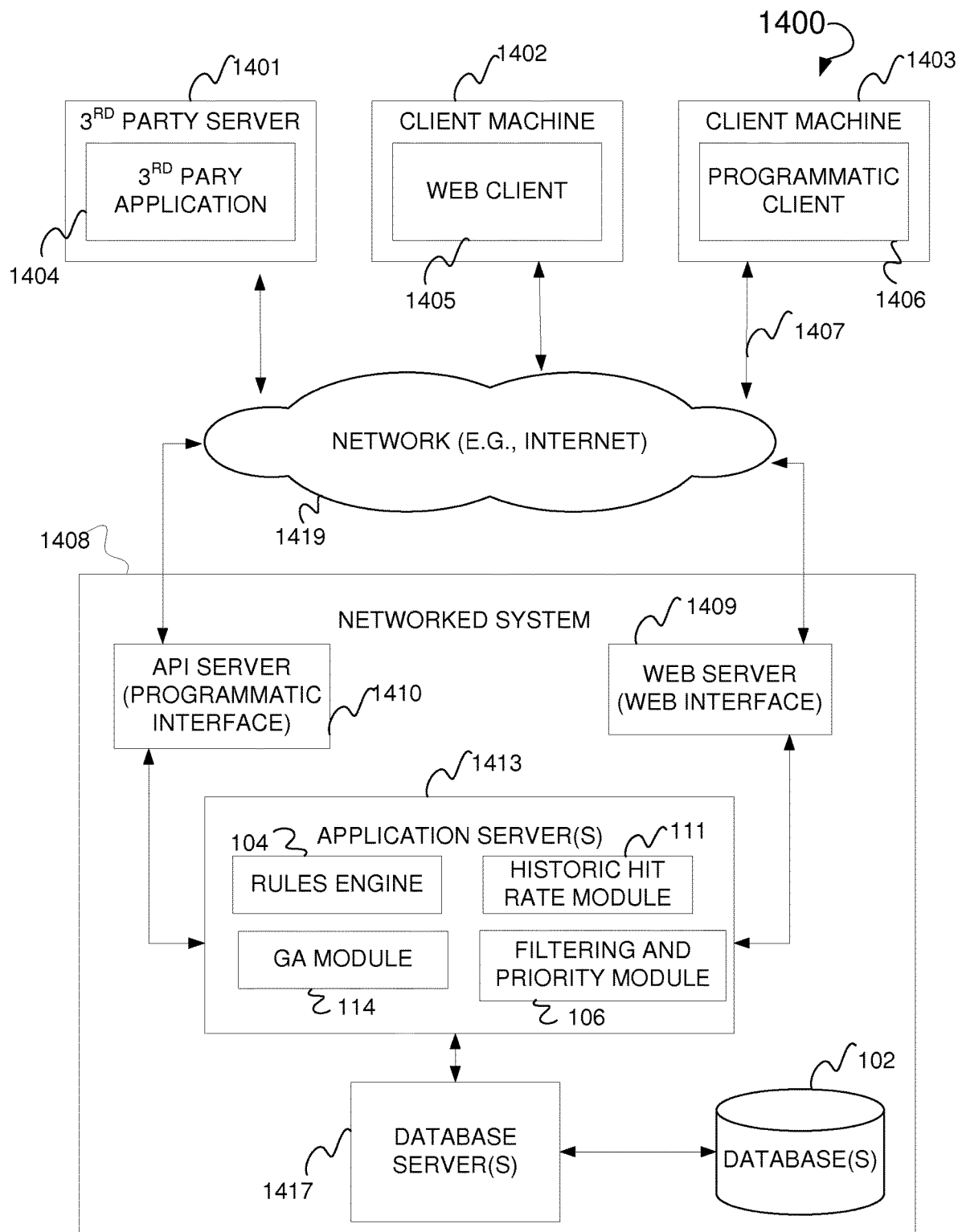
FIG. 14 illustrates an example platform architecture.

FIG. 14 illustrates a platform architecture 1400. Some embodiments describe a third-party server 1401 that contains a third-party application 1404. Some example embodiments may include a client machine 1402 containing a web client 1405. Some embodiments describe a client machine 1403 that contains a programmatic client 1406. Some example embodiments may include the third-party server 1401, client machine 1402, and client machine 1403 being operatively connected via a network such as an Internet 1419 to one or more web servers or application servers. This connection between these various third-party servers and client machines (e.g., 1401, 1402, and 1403) is via a TCP/IP connection 1407. In some example embodiments, this TCP/IP connection 1407 interfaces with a API server programmatic interface 1410, or a web server containing a web interface 1409. The API programmatic server interface 1410 interfaces with an application server 1413. Some embodiments describe the web interface 1409 that interfaces with the same application server 1413. Some example embodiments may include the application server 1413 being one application server whereas another embodiment it is a plurality of application servers. In some example embodiments, this one application server or plurality of application servers 1413 contains a variety of application modules. These application modules including a rules engine 104, a genetic algorithm module 114, a reaper 113 & historic hit rate module 111, and a filtering and priority module 106. These one or more application servers 1413 interfaces with a database server 1417. In some example embodiments, this database server 1417 contains a plurality of databases 102.

In some embodiments, a digital processing system or computer system is implemented that includes a processor, which may represent one or more processors and may include one or more conventional types of such processors (e.g., x86, x86-64), such as an AMD processor, Intel Pentium processor or other suitable processor. A memory is coupled to the processor by a bus. The memory may be a dynamic random access memory (DRAM) and/or may include static RAM (SRAM). The processor may also be coupled to other types of storage areas/memories (e.g., cache, Flash memory, disk, etc.), which could be considered as part of the memory or separate from the memory.

Some example embodiments may include a bus further coupling the processor to a display controller, a mass memory or some type of computer-readable medium device, a modem or network interface card or adaptor, and an input/output (I/O) controller. The display controller controls, in a conventional manner, a display, which may represent a cathode ray tube (CRT) display, a liquid crystal display (LCD), a plasma display, or other type of suitable display device. Computer-readable medium may include a mass memory magnetic, optical, magneto-optical, tape, and/or other type of machine-readable medium/device for storing information. For example, the computer-readable medium may represent a hard disk, a read-only or writeable optical CD, etc. Some example embodiments may include a network adaptor card such as a modem or network interface card being used to exchange data across a network such as an Internet. The I/O controller controls I/O device(s), which may include one or more keyboards, mouse/trackball, or other pointing devices, magnetic and/or optical disk drives, printers, scanners, digital cameras, microphones, etc.

In some embodiments, an embodiment may be implemented entirely in executable computer program instructions which are stored on a computer-readable medium or may be implemented in a combination of software and hardware, or entirely in hardware via circuits such as logic circuits.

Embodiments within the scope of the present invention include computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage medium such as RAM, ROM, EPROM, CD-ROM, or other optical-disk storage, magnetic-disk storage or other magnetic-storage devices, or any other medium which can be used to carry or store desired program code means in the form of computer-executable instructions, computer-readable instructions, or data structures and which may be accessed by a general-purpose or special-purpose computer system. This physical storage medium may be fixed to the computer system as in the case of a magnetic drive or removable as in the case of an EEPROM device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this description, and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or Personal Digital Assistant (PDA)) where internal modules (e.g., a processor and memory) work together to perform operations on electronic data.

Some embodiments may be practiced in network computing environments with many types of computer system configurations, including hubs, routers, wireless access points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. One embodiment can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

Figure 15:
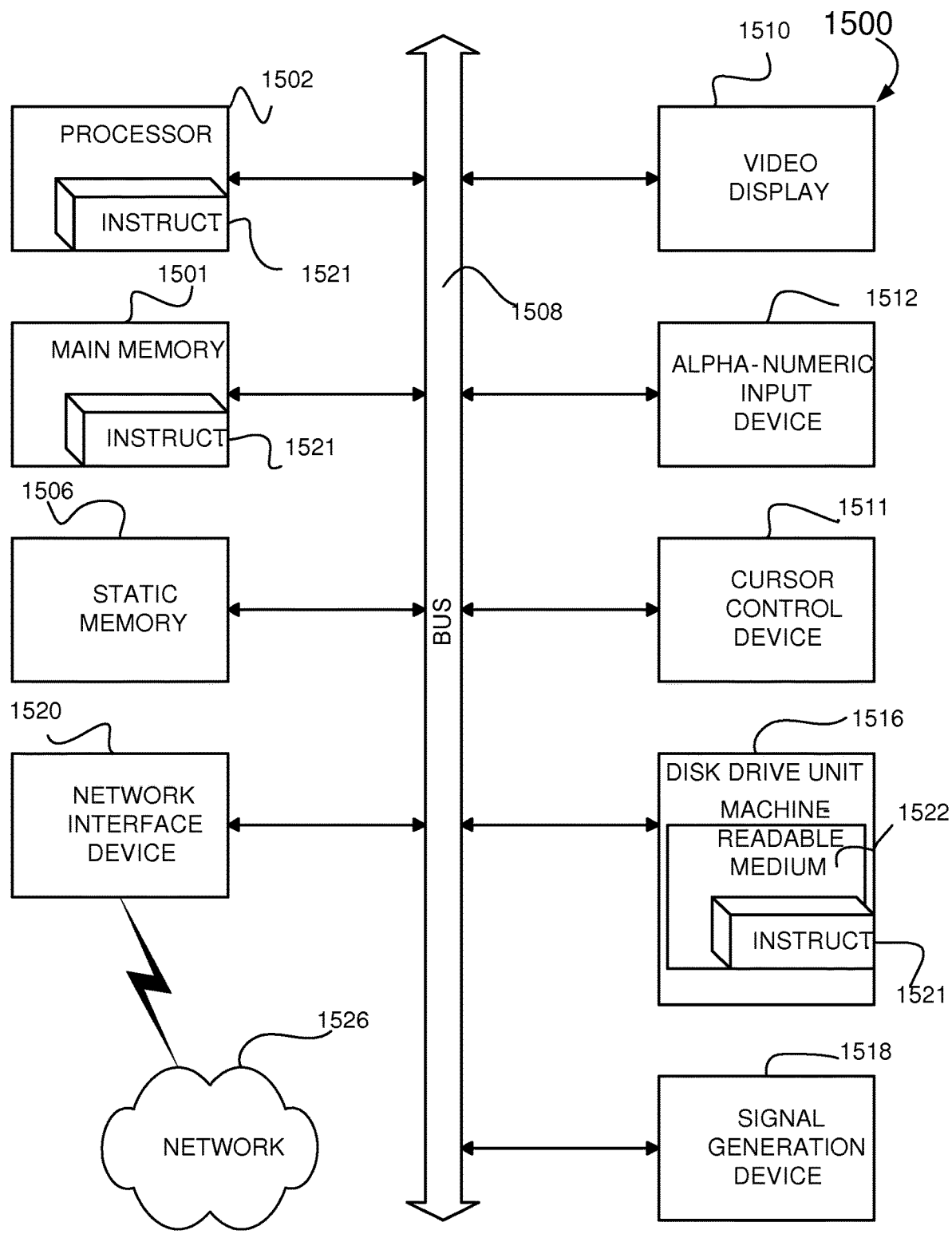
FIG. 15 is an example schematic of a computer system.

FIG. 15 shows a diagrammatic representation of a machine in the example form of a computer system 1500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks. In a distributed system environment, program modules may be located in both local and remote memory-storage devices (see below).

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) cursor controller 1511 (e.g., a mouse), a disk drive unit 1516, a signal generation device 1518 (e.g., a speaker) and a network interface device (e.g., a transmitter) 1520.

The disk drive unit 1516 includes a machine-readable medium 1522 on which is stored one or more sets of instructions and data structures (e.g., software) embodying or utilized by any one or more of the methodologies or functions described herein. The software may also reside, completely or at least partially, within the main memory 1501 and/or within the processor 1502 during execution thereof by the computer system 1500, the main memory 1501 and the processor 1502 also constituting machine-readable media.

The instructions 1521 may further be transmitted or received over a network 1526 via the network interface device 1520 utilizing any one of a number of well-known transfer protocols (e.g., HTTP, SIP).

While the removable physical storage medium 101 is shown in an example embodiment to be a single medium, the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies described herein. The term "machine-readable medium" shall accordingly be taken to include, but not be limited to, solid-state memories, optical and magnetic medium, and carrier wave signals.

Marketplace Applications

Some embodiments, described herein, may have a variety of marketplace applications. For example no test bed is needed to generate rules. And again, some example embodiments may include on the fly rules generation and testing being performed. And again massive independent peer review of rules can take place. An API can be used by third-party vendors to, for example, create new rules directly, or by using the genetic algorithm module 114, or to use the rules engine 104 to actually test these created rules.

Some example embodiments may include no test bed being needed for implementing the various rules of the present invention. One upshot of this, with regard to marketplace applications, is that rather than having a highly organized testing structure, wherein test beds are generated and data is tested using these test beds, data and rules can be tested without resorting to some highly structured system of testing.

In some embodiments, on the fly rules generation in testing is implemented. The advantage of on the fly rules generation in testing is that rather than having an instance of fraud escalated to some type of supervisor who would, in turn, generate antifraud rules that can be generated by those who have first hand knowledge of the fraud taking place. These persons include those who have either examined the facts surrounding the fraud, or who have an intuition regarding the possible existence of the fraud. This allows individuals with this knowledge to generate rules and to test these rules without having to resort to supervisors who may be removed from the facts surrounding a particular instance of fraud, or removed from the intuition required to detect this fraud.

In some embodiments, massive independent peer review is facilitated. For example rules are open for review by anyone who is able to use the system. This allows for anyone to comment on the efficacy and applicability of these rules, and allows anyone to test these rules. In some embodiment, this is an advantageous over other systems which merely allow for only persons in a supervisory capacity to create, test and review rules. In this way the present system is very egalitarian in that it allows persons with first hand knowledge of a fraud to be able to generate rules to counter this fraud, rather than having individuals who do not have first hand knowledge of particular instance of fraud, but who are changed with generating rules based merely upon their employment position and seniority, to generate rules. By allowing large scale risk free experimentation by many individuals, some embodiments may allow bottom-up innovation to emerge in large organizations which is critical in a fast changing world such as fraud.

Some example embodiments may include further marketplace applications in the form of allowing third-parties to use various APIs as associated with the genetic algorithm module 114 and rules engine 104 to create new rules to be tested and modified. For example a particular third-party may have been subjected to a fraudulent scheme that a particular user, of one embodiment of the present invention, may not have been subjected to. The system may be rich and robust in terms of its ability to meet potential fraud.

In some example embodiments, users of the present system will be able to, for example, charge a fee to allow third parties to use the API as associated with, for example, the genetic algorithm module 114 or the rules engine 104. For example, a third party may want to test, and benefit from the creation of a rules set, through the use of the genetic algorithm module 114. More to the point, the genetic algorithm module 114 can be used to modify an existing rule set and, once the existing rule set is modified, the rules engine 104 can be used to test this rule set. A fee can be charged to allow the third parties to have access to this genetic algorithm module 114 API, and rules engine 104 API. (See e.g., FIGS. 3 & 4 above)

Some example embodiments may include a further marketplace application in instances where there is a need to reduce labor costs associated with fraud prevention. For example labor costs can be reduced by creating a more linear or flat organizational structure within the particular fraud detection regime of a particular corporation. For example, rather than having a hierarchy of first-tier fraud agents, a second-tier of supervisory agents, and a third-tier of supervisory managers controlling or directing the actions of these other two-tiers one embodiment can allow for a single-tier to be used. Some example embodiments may include one implementation allowing for a corporation or company engaging in E-ecommerce to have a single-tier of persons reviewing fraudulent or potentially fraudulent transactions. More to the point the present system through, for example, its on the fly rules generation and testing, allows persons with first hand knowledge of fraudulent transactions (e.g., fraud agents alone) to generate as many rules as they would like irrespective of the costs associated with these rules. More to the point, the ability to generate a rule, using one embodiment of the present invention, is limited only by the time that it takes an agent to actually generate the rule. That is, there is little cost associated with escalating a potentially fraudulent account to a second or even third tier of review.

Some embodiments may include a system including: a receiver operatively coupled to one or more application servers for receiving a rules set whose function is to detect fraud, one or more database servers operatively coupled to the one or more application servers to facilitate mapping the rules set to a data set, and for mapping success data to each members of the rules set, wherein the one or more database servers is operatively coupled to the one or more application servers so as to facilitate the filtering of the members of the rule set, and wherein the one or more database servers is operatively coupled to the one or more application servers so as to facilitate the ordering of the members of the data set by giving priority to those members of the data set with the greatest probability for being fraudulent based upon the success data of each member of the rule set in detecting fraud.

In some example embodiments, a system is described as including: a receiver operatively coupled to one or more application servers for receiving a rules set whose function is to detect fraud, one or more database servers operatively coupled to the one or more application servers so as to facilitate the finding of the logical intersection of a set of accounts captured by each rule and a set containing data that has been determined to be fraudulent wherein the one or more application servers facilitates producing new rule members using the fit rule members from the logical intersection, and wherein the one or more application servers facilitates injecting the new rule members and the fit rule members into a Rules Engine.

Some example embodiments may include a method being described as including: receiving a rules set whose function is to detect fraud, mapping the rules set to a data set, mapping success data to each members of the rules set, filtering the members of the rule set, and ordering members of the data set by giving priority to those members of the data set with the greatest probability for being fraudulent based upon the success data of each member of the rule set in detecting fraud. The method is further described as including receiving the rules set via a GUI. The method is further described as including receiving the rules set via an API. The method also includes account information that makes up members of the data set. The methods also include storing the mapping of the rules set to the data set in a storage medium. Furthermore, the method additionally includes the mapping of the success data to each member of the rules set in a storage medium. Moreover, the method also includes filtering and removing a member of the rules set based upon metadata. Additionally, the method includes filtering wherein a member of the rules set is removed based upon the low probability of the member rule in being able to detect fraud. The method also includes filtering such that duplicate mappings of the members of the rules set to the members of the data set are removed, where a first member rule of the rule set has a higher success data value as compared to a second member rule of the rule set. The method also includes taking members of the data set and ordering them using a priority queue. This method is implemented in a machine-readable medium containing a set of instructions that are executable by a suitability programmed computer.

Some example embodiments may include a method being implemented that includes: receiving a rules set whose function is to detect fraud, finding the logical intersection of a set of accounts captured by each rule and a set containing data that has been determined to be fraudulent, selecting fit rule members from the logical intersection, producing new rule members using the fit rule members from the logical intersection, and injecting the new rule members and the fit rule members into a Rules Engine. Moreover the method further includes receiving the rules set via a GUI. Additionally, the method further includes receiving the rules set via an API. Furthermore the method further includes determining the fitness of the rule member based upon the return on investment for using the rule. The method may also include using crossover in producing a new member rule. The method also includes using mutation to produce a new member rule. The method may also include using a machine-readable medium containing a set of instructions that are executable by a suitability programmed computer to perform the method.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
   one or more processors; and
   a non-transitory computer-readable medium having stored thereon instructions that are executable by the one or more processors to cause the system to perform operations comprising:
      accessing a first plurality of transaction risk evaluation rules based on feature data corresponding to a first set of electronic transactions initiated by a plurality of different users, wherein each of the first plurality of transaction risk evaluation rules has a corresponding feature evaluation set that utilizes one or more respective features from the feature data;
determining initial evaluation results based on applying the first plurality of transaction risk evaluation rules to an evaluation set of electronic transactions, wherein the initial evaluation results indicate a performance ranking of the first plurality of transaction risk evaluation rules;
based on the performance ranking from the initial evaluation results, filtering the first plurality of transaction risk evaluation rules to generate a filtered set of transaction risk evaluation rules;
automatically generating a second plurality of transaction risk evaluation rules from the filtered set of transaction risk evaluation rules, including by:
selecting first and second transaction risk evaluation rules from the filtered set of transaction risk evaluation rules;
applying a genetic algorithm to create a genetically modified new transaction risk evaluation rule that is based on:
at least a first evaluation feature from a feature evaluation set for the first transaction risk evaluation rule, and
at least a second evaluation feature from a feature evaluation set for the second transaction risk evaluation rule; and
including the genetically modified new transaction risk evaluation rule in the second plurality of transaction risk evaluation rules; and
providing the second plurality of transaction risk evaluation rules for deployment in a computer environment configured to permit or decline transactions, initiated by users of a transaction service, based on the second plurality of transaction risk evaluation rules.

2. The system of claim 1, wherein the operations further comprise:
applying a fitness algorithm to the first evaluation feature and the second evaluation feature to generate respective first and second fitness scores.

3. The system of claim 2, wherein the operations further comprise:
automatically selecting the first and second evaluation features for creation of the genetically modified new transaction risk evaluation rule based on the first and second fitness scores.

4. The system of claim 1, wherein the first transaction risk evaluation rule and the second transaction risk evaluation rule are organized with a tree structure.

5. The system of claim 4, wherein creating the genetically modified new transaction risk evaluation rule comprises appending a portion of the tree structure for the first transaction risk evaluation rule to a portion of the tree structure for the second transaction risk evaluation rule.

6. The system of claim 1, wherein the operations further comprise:
mutating the genetically modified new transaction risk evaluation rule prior to including it in the second plurality of transaction risk evaluation rules.

7. The system of claim 6, wherein mutating the genetically modified new transaction risk evaluation rule comprises altering at least a first threshold feature value in the first transaction risk evaluation rule.

8. The system of claim 6, wherein mutating the genetically modified new transaction risk evaluation rule further comprises altering at least a second threshold feature value in the second transaction risk evaluation rule.

9. A method, comprising:
accessing a first plurality of transaction risk evaluation rules generated based on feature data corresponding to a first set of electronic transactions initiated by a plurality of different users, wherein each of the first plurality of transaction risk evaluation rules has a corresponding feature evaluation set that utilizes one or more respective features from the feature data;
determining initial evaluation results based on applying the first plurality of transaction risk evaluation rules to an evaluation set of electronic transactions, wherein the initial evaluation results indicate a performance ranking of the first plurality of transaction risk evaluation rules;
based on the performance ranking from the initial evaluation results, filtering the first plurality of transaction risk evaluation rules to generate a filtered set of transaction risk evaluation rules;
automatically generating a second plurality of transaction risk evaluation rules from the filtered set of transaction risk evaluation rules, including by:
selecting first and second transaction risk evaluation rules from the filtered set of transaction risk evaluation rules;
applying a genetic algorithm to create a genetically modified new transaction risk evaluation rule that is based on:
at least a first evaluation feature from a feature evaluation set for the first transaction risk evaluation rule, and
at least a second evaluation feature from a feature evaluation set for the second transaction risk evaluation rule;
including the genetically modified new transaction risk evaluation rule in the second plurality of transaction risk evaluation rules; and
deploying the second plurality of transaction risk evaluation rules in a computer environment configured to permit or decline financial transactions initiated by users of a financial transaction service.

10. The method of claim 9, further comprising:
evaluating, by one or more systems within the computer environment, risk levels for a plurality of new real-world financial transactions using the second plurality of transaction risk evaluation rules; and
based on results of evaluating the risk levels, permitting or declining individual ones of the plurality of new real-world financial transactions.

11. The method of claim 9, further comprising:
flagging one or more user accounts of the financial transaction service as being associated with fraud based on the initial evaluation results.

12. The method of claim 9, wherein at least a portion of the genetically modified new transaction risk evaluation rule is configured to evaluate an email address corresponding to a given electronic transaction.

13. The method of claim 9, further comprising:
applying a fitness algorithm to the first evaluation feature and the second evaluation feature to generate respective first and second fitness scores.

14. The method of claim 13, further comprising:
automatically selecting the first and second evaluation features for creation of the genetically modified new transaction risk evaluation rule based on the first and second fitness scores.

15. The method of claim 9, wherein the applying the genetic algorithm includes performing at least one of a crossover operation or a mutation operation.

16. A non-transitory computer-readable medium having instructions stored thereon that are executable by a computer system to cause the computer system to perform operations comprising:
accessing a first plurality of transaction risk evaluation rules generated based on feature data corresponding to a first set of electronic transactions initiated by a plurality of different users, wherein each of the first plurality of transaction risk evaluation rules has a corresponding feature evaluation set that utilizes one or more respective features from the feature data;
determining initial evaluation results based on applying the first plurality of transaction risk evaluation rules to an evaluation set of electronic transactions, wherein the initial evaluation results indicate a performance ranking of the first plurality of transaction risk evaluation rules;
based on the performance ranking from the initial evaluation results, filtering the first plurality of transaction risk evaluation rules to generate a filtered set of transaction risk evaluation rules;
automatically generating a second plurality of transaction risk evaluation rules from the filtered set of transaction risk evaluation rules, including by:
selecting first and second transaction risk evaluation rules from the filtered set of transaction risk evaluation rules;
applying a genetic algorithm to create a genetically modified new transaction risk evaluation rule that is based on:
at least a first evaluation feature from a feature evaluation set for the first transaction risk evaluation rule, and
at least a second evaluation feature from a feature evaluation set for the second transaction risk evaluation rule;
including the genetically modified new transaction risk evaluation rule in the second plurality of transaction risk evaluation rules; and
deploying the second plurality of transaction risk evaluation rules in a computer environment configured to permit or decline financial transactions initiated by users of a financial transaction service.

17. The non-transitory computer-readable medium of claim 16, wherein the operations further comprise:
evaluating a fitness of the genetically modified new transaction risk evaluation rule prior to including it in the second plurality of transaction risk evaluation rules.

18. The non-transitory computer-readable medium of claim 17, wherein evaluating the fitness of the genetically modified new transaction risk evaluation rule includes applying the genetically modified new transaction risk evaluation rule to the evaluation set of electronic transactions.

19. The non-transitory computer-readable medium of claim 16, wherein the operations further comprise:
evaluating risk levels for a plurality of new real-world financial transactions using the second plurality of transaction risk evaluation rules; and
based on results of evaluating the risk levels, permitting or declining individual ones of the plurality of new real-world financial transactions.

* * * * *